US011297346B2

(12) United States Patent
Chou et al.

(10) Patent No.: US 11,297,346 B2
(45) Date of Patent: Apr. 5, 2022

(54) MOTION-COMPENSATED COMPRESSION OF DYNAMIC VOXELIZED POINT CLOUDS

(71) Applicant: Microsoft Technology Licensing, LLC, Redmond, WA (US)

(72) Inventors: Philip A. Chou, Bellevue, WA (US); Ricardo L. de Queiroz, Brasilia (BR)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/168,019

(22) Filed: May 28, 2016

(65) Prior Publication Data

US 2017/0347120 A1  Nov. 30, 2017

(51) Int. Cl.
| | | |
|---|---|---|
| *H04N 19/43* | (2014.01) | |
| *H04N 19/597* | (2014.01) | |
| *H04N 19/89* | (2014.01) | |
| *H04N 19/82* | (2014.01) | |
| *H04N 19/119* | (2014.01) | |
| *H04N 19/15* | (2014.01) | |

(Continued)

(52) U.S. Cl.
CPC .......... *H04N 19/597* (2014.11); *G06T 9/001* (2013.01); *G06T 9/004* (2013.01); *H04N 19/107* (2014.11);
(Continued)

(58) Field of Classification Search
CPC ...... H04N 19/15; H04N 19/521; H04N 19/50; H04N 19/597; H04N 19/86; H04N 19/89; H04N 19/82; G06T 9/001; G06T 9/004
See application file for complete search history.

(56) References Cited

U.S. PATENT DOCUMENTS

| 4,999,705 A | 3/1991 | Puri |
|---|---|---|
| 5,842,004 A | 11/1998 | Deering et al. |

(Continued)

FOREIGN PATENT DOCUMENTS

| CN | 103701466 | 4/2014 |
|---|---|---|
| WO | WO 00/49571 | 8/2000 |

(Continued)

OTHER PUBLICATIONS

Ahn et al., "Motion-compensated compression of 3D animation models," *Journal of Electronics Letters*, vol. 37, No. 24, pp. 1445-1446 (Nov. 2001).

(Continued)

*Primary Examiner* — Md N Haque
*Assistant Examiner* — Berteau Joisil
(74) *Attorney, Agent, or Firm* — Klarquist Sparkman, LLP

(57) ABSTRACT

Disclosed herein are exemplary embodiments of innovations in the area of point cloud encoding and decoding. Example embodiments can reduce the computational complexity and/or computational resource usage during 3D video encoding by selectively encoding one or more 3D-point-cloud blocks using an inter-frame coding (e.g., motion compensation) technique that allows for previously encoded/decoded frames to be used in predicting current frames being encoded. Alternatively, one or more 3D-point-cloud block can be encoded using an intra-frame encoding approach. The selection of which encoding mode to use can be based, for example, on a threshold that is evaluated relative to rate-distortion performance for both intra-frame and inter-frame encoding. Still further, embodiments of the disclosed technology can use one or more voxel-distortion-correction filters to correct distortion errors that may occur during voxel compression. Such filters are uniquely adapted for the particular challenges presented when compressing 3D image data. Corresponding decoding techniques are also disclosed.

20 Claims, 18 Drawing Sheets

(51) Int. Cl.
| | | |
|---|---|---|
| H04N 19/513 | (2014.01) | |
| H04N 19/50 | (2014.01) | |
| H04N 19/19 | (2014.01) | |
| G06T 9/00 | (2006.01) | |
| H04N 19/147 | (2014.01) | |
| H04N 19/86 | (2014.01) | |
| H04N 19/107 | (2014.01) | |
| H04N 19/176 | (2014.01) | |

(52) U.S. Cl.
CPC ......... *H04N 19/119* (2014.11); *H04N 19/147* (2014.11); *H04N 19/15* (2014.11); *H04N 19/176* (2014.11); *H04N 19/19* (2014.11); *H04N 19/43* (2014.11); *H04N 19/50* (2014.11); *H04N 19/521* (2014.11); *H04N 19/82* (2014.11); *H04N 19/86* (2014.11); *H04N 19/89* (2014.11)

(56) References Cited

U.S. PATENT DOCUMENTS

| | | | |
|---|---|---|---|
| 6,028,635 | A | 2/2000 | Yamaguchi et al. |
| 6,519,284 | B1 | 2/2003 | Pesquet-Popescu et al. |
| 6,563,500 | B1 | 5/2003 | Kim et al. |
| 6,771,809 | B1 | 8/2004 | Rubbert et al. |
| 8,340,177 | B2 | 12/2012 | Ji et al. |
| 2005/0041842 | A1* | 2/2005 | Frakes ............... G06K 9/3216 382/128 |
| 2007/0121719 | A1 | 5/2007 | Van Der Schaar et al. |
| 2008/0267291 | A1 | 10/2008 | Vieron et al. |
| 2010/0239178 | A1 | 9/2010 | Osher et al. |
| 2011/0010400 | A1 | 1/2011 | Hayes |
| 2011/0142321 | A1 | 6/2011 | Huffman |
| 2012/0093429 | A1 | 4/2012 | Van Der Vleuten et al. |
| 2012/0245931 | A1 | 9/2012 | Yamanashi et al. |
| 2013/0114707 | A1* | 5/2013 | Seregin ............... H04N 19/463 375/240.12 |
| 2013/0156306 | A1 | 6/2013 | Masuko |
| 2013/0242051 | A1 | 9/2013 | Balogh |
| 2013/0294706 | A1 | 11/2013 | Maurer et al. |
| 2013/0297574 | A1 | 11/2013 | Thiyanaratnam |
| 2013/0300740 | A1 | 11/2013 | Snyder et al. |
| 2014/0205009 | A1 | 7/2014 | Rose et al. |
| 2014/0254679 | A1 | 9/2014 | Ramasubramonian et al. |
| 2015/0010074 | A1 | 1/2015 | Choi et al. |
| 2015/0101411 | A1 | 4/2015 | Zalev et al. |
| 2015/0288963 | A1 | 10/2015 | Sato |
| 2016/0047903 | A1 | 2/2016 | Dussan |
| 2016/0073129 | A1 | 3/2016 | Lee et al. |
| 2016/0086353 | A1* | 3/2016 | Lukac ..................... G06T 9/00 345/419 |
| 2016/0232420 | A1 | 8/2016 | Fan et al. |
| 2017/0155906 | A1 | 6/2017 | Puri |
| 2017/0214943 | A1 | 7/2017 | Cohen et al. |
| 2017/0237996 | A1* | 8/2017 | Schneider ............ H04N 19/184 382/168 |
| 2017/0347100 | A1 | 11/2017 | Chou et al. |
| 2017/0347122 | A1 | 11/2017 | Chou et al. |

FOREIGN PATENT DOCUMENTS

| | | |
|---|---|---|
| WO | WO 2005/078663 | 8/2005 |
| WO | WO 2015/006884 | 1/2015 |
| WO | WO 2015/090682 | 6/2015 |

OTHER PUBLICATIONS

Altunbasak et al., "Realizing the Vision of Immersive Communication," *IEEE Signal Processing Magazine*, vol. 28, Issue 1, pp. 18-19 (Jan. 2011).

Alwani et al., "Restricted Affine Motion Compensation in Video Coding using Particle Filtering," *Indian Conf. on Computer Vision, Graphics, and Image Processing*, pp. 479-484 (Dec. 2010).

Anis et al., "Compression of Dynamic 3D Point Clouds Using Subdivisional Meshes and Graph Wavelet Transforms," *Int'l Conf. on Acoustics, Speech, and Signal Processing*, 5 pp. (Mar. 2016).

Apostolopoulos et al., "The Road to Immersive Communication," *Proc. of the IEEE*, vol. 100, No. 4, pp. 974-990 (Apr. 2012).

"Being There Centre," downloaded from http://imi.ntu.edu.sg/BeingThereCentre/Pages/BTChome.aspx, 1 p. (downloaded on May 13, 2016).

Briceño et al., "Geometry Videos: A New Representation for 3D Animations," *Eurographics/SIGGRAPH Symp. on Computer Animation*, pp. 136-146 (Jul. 2003).

Chou, "Advances in Immersive Communication: (1) Telephone, (2) Television, (3) Teleportation," *ACM Trans. on Multimedia Computing, Communications and Applications*, vol. 9, No. 1s, 4pp. (Oct. 2013).

Collet et al., "High-Quality Streamable Free-Viewpoint Video," *ACM Trans. on Graphics*, vol. 34, Issue 4, 13 pp. (Aug. 2015).

"CyPhy—Multi-Modal Teleimmersion for Tele-Physiotherapy," downloaded from http://cairo.cs.uiuc.edu/projects/teleimmersion/ , 3 pp. (downloaded on May 13, 2016).

De Queiroz et al., "Compression of 3D Point Clouds Using a Region-Adaptive Hierarchical Transform," *IEEE Trans. on Image Processing*, 10 pp. (May 2016).

De Queiroz, "On Data Filling Algorithms for MRC Layers," *Int'l Conf. on Image Processing*, vol. 2, 4 pp. (Sep. 2000).

Devillers et al., "Geometric Compression for Interactive Transmission," *IEEE Conf. on Visualization*, pp. 319-326 (Oct. 2000).

Dou et al., "3D Scanning Deformable Objects with a Single RGBD Sensor," *IEEE Conf. on Computer Vision and Pattern Recognition*, pp. 493-501 (Jun. 2015).

Flierl et al., "Inter-Resolution Transform for Spatially Scalable Video Coding," *Picture Coding Symp.*, 6 pp. (Dec. 2004).

Girod et al., "3-D Image Models and Compression—Synthetic Hybrid or Natural Fit?," *Int'l Conf. on Image Processing*, vol. 2, 5 pp. (Oct. 1999).

Gottfried et al., "Computing Range Flow from Multi-modal Kinect Data," *Int'l Conf. on Advances in Visual Computing*, pp. 758-767 (Sep. 2011).

Gu et al., "Geometry Images," *Proc. Conf. on Computer Graphics and Interactive Techniques*, pp. 355-361 (Jul. 2002).

Gupta et al., "Registration and Partitioning-Based Compression of 3-D Dynamic Data," *IEEE Trans. on Circuits and Systems for Video Technology*, vol. 13, No. 11, pp. 1144-1155 (Nov. 2003).

Habe et al., "Skin-Off: Representation and Compression Scheme for 3D Video," *Proc. of Picture Coding Symp.*, pp. 301-306 (Dec. 2004).

Hadfield et al., "Scene Particles: Unregularized Particle-Based Scene Flow Estimation," *IEEE Trans. on Pattern Analysis and Machine Intelligence*, vol. 36, No. 3, pp. 564-576 (Mar. 2014).

Han et al., "Time-Varying Mesh Compression Using an Extended Block Matching Algorithm," *IEEE Trans. on Circuits and Systems for Video Technology*, vol. 17, No. 11, pp. 1506-1518 (Nov. 2007).

Hebert et al., "Terrain Mapping for a Roving Planetary Explorer," *IEEE Int'l Conf. on Robotics and Automation*, pp. 997-1002 (May 1989).

Herbst et al., "RGB-D Flow: Dense 3-D Motion Estimation Using Color and Depth," *Int'l Conf. on Robotics and Automation*, 7 pp. (May 2013).

Hornáček et al., "SphereFlow: 6 DoF Scene Flow from RGB-D Pairs," *IEEE Conf. on Computer Vision and Pattern Recognition*, pp. 3526-3533 (Jun. 2014).

Hou et al., "Compressing 3-D Human Motions via Keyframe-Based Geometry Videos," *IEEE Trans. on Circuits and Systems for Video Technology*, vol. 25, No. 1, pp. 51-62 (Jan. 2015).

Houshiar et al., "3D Point Cloud Compression using Conventional Image Compression for Efficient Data Transmission," *Int'l Conf. on Information, Communication and Automation Technologies*, 8 pp. (Oct. 2015).

Huang et al., "A Generic Scheme for Progressive Point Cloud Coding," *IEEE Trans. on Visualization and Computer Graphics*, vol. 14, No. 2, pp. 440-453 (Mar. 2008).

(56) References Cited

OTHER PUBLICATIONS

Huang et al., "Octree-Based Progressive Geometry Coding of Point Clouds," *Europgraphics Symp. on Point-Based Graphics*, 9 pp. (Jul. 2006).
Kammerl, "Development and Evaluation of Point Cloud Compression for the Point Cloud Library," Institute for Media Technology, Powerpoint presentation, 15 pp. (May 2011).
Kammerl et al., "Real-time Compression of Point Cloud Streams," *IEEE Int'l Conf. on Robotics and Automation*, pp. 778-785 (May 2012).
Kim et al., "Low Bit-Rate Scalable Video Coding with 3-D Set Partitioning in Hierarchical Trees (3-D SPIHT)," *IEEE Trans. on Circuits and Systems for Video Technology*, vol. 10, No. 8, pp. 1374-1387 (Dec. 2000).
Lanier, "Virtually There," *Journal of Scientific American*, 16 pp. (Apr. 2001).
Li, "Visual Progressive Coding," *Journal of International Society for Optics and Photonics*, 9 pp. (Dec. 1998).
Loop et al., "Real-Time High-Resolution Sparse Voxelization with Application to Image-Based Modeling," *Proc. High-Performance Graphics Conf.*, pp. 73-79 (Jul. 2013).
Malvar, "Adaptive Run-Length/Golomb-Rice Encoding of Quantized Generalized Gaussian Sources with Unknown Statistics," *Data Compression Conf.*, 10 pp. (Mar. 2006).
Mekuria et al., "A 3D Tele-Immersion System Based on Live Captured Mesh Geometry," *ACM Multimedia Systems Conf.*, pp. 24-35 (Feb. 2013).
Mekuria et al., "Design, Implementation and Evaluation of a Point Cloud Codec for Tele-Immersive Video," *IEEE Trans. on Circuits and Systems for Video Technology*, 14 pp. (May 2016).
Merkle et al., "Multi-View Video Plus Depth Representation and Coding," *IEEE Int'l Conf. on Image Processing*, vol. 1, 4 pp. (Sep. 2007).
Minami et al., "3-D Wavelet Coding of Video with Arbitrary Regions of Support," *IEEE Trans. on Circuits and Systems for Video Technology*, vol. 11, No. 9, pp. 1063-1068 (Sep. 2001).
Müller et al., "Rate-Distortion-Optimized Predictive Compression of Dynamic 3D Mesh Sequences," *Journal of Signal Processing: Image Communication*, vol. 21, Issue 9, 28 pp. (Oct. 2006).
Nguyen et al., "Compression of Human Body Sequences Using Graph Wavelet Filter Banks," *IEEE Int'l Conf. on Acoustics, Speech and Signal Processing*, pp. 6152-6156 (May 2014).
Niu et al., "Compass Rose: A Rotational Robust Signature for Optical Flow Computation," *IEEE Trans. on Circuits and Systems for Video Technology*, vol. 24, No. 1, pp. 63-73 (Jan. 2014).
Ochotta et al., "Compression of Point-Based 3D Models by Shape-Adaptive Wavelet Coding of Multi-Height Fields," *Europgraphics Symp. on Point-Based Graphics*, 10 pp. (Jun. 2004).
Peng et al., "Technologies for 3D mesh compression: A survey," *Journal of Visual Communication and Image Representation*, vol. 16, Issue 6, pp. 688-733 (Apr. 2005).
Quiroga et al., "Dense Semi-Rigid Scene Flow Estimation from RGBD images," *European Conf. on Computer Vision*, 16 pp. (Sep. 2014).
Quiroga et al., "Local/Global Scene Flow Estimation," *IEEE Int'l Conf. on Image Processing*, pp. 3850-3854 (Sep. 2013).
"REVERIE REal and Virtual Engagement in Realistic Immersive Environments," downloaded from http://www.reveriefp7.eu/, 3 pp. (downloaded on May 13, 2016).
Rusu et al., "3D is here: Point Cloud Library (PCL)," *IEEE Int'l Conf. on Robotics and Automation*, 4 pp. (May 2011).
Said, "Introduction to Arithmetic Coding—Theory and Practice," HP Technical Report HPL-2004-76, 67 pp. (Apr. 2004).
Schnabel et al., "Octree-based Point-Cloud Compression," *Eurographics Symp. on Point-Based Graphics*, 11 pp. (Jul. 2006).
Secker et al., "Motion-Compensated Highly Scalable Video Compression Using an Adaptive 3D Wavelet Transform Based on Lifting," *IEEE Int'l Conf. on Image Processing*, vol. 2, pp. 1029-1032 (Oct. 2001).

Stefanoski et al., "Spatially and Temporally Scalable Compression of Animated 3D Meshes with MPEG-4/FAMC," *IEEE Int'l Conf. on Image Processing*, pp. 2696-2699 (Oct. 2008).
Sun et al., "Rate-Constrained 3D Surface Estimation From Noise-Corrupted Multiview Depth Videos," *IEEE Trans. on Image Processing*, vol. 23, No. 7, pp. 3138-3151 (Jul. 2014).
Thanou et al., "Graph-based compression of dynamic 3D point cloud sequences," *IEEE Trans. on Image Processing*, vol. 25, No. 4, 13 pp. (Apr. 2016).
Thanou et al., "Graph-Based Motion Estimation and Compensation for Dynamic 3D Point Cloud Compression," *IEEE Int'l Conf. on Image Processing*, pp. 3235-3239 (Sep. 2015).
Tran, "Image Coding and JPEG," ECE Department, The Johns Hopkins University, powerpoint presentation, 92 pp. (downloaded on May 9, 2016).
Triebel et al., "Multi-Level Surface Maps for Outdoor Terrain Mapping and Loop Closing," *IEEE Int'l Conf. on Intelligent Robots and Systems*, pp. 2276-2282 (Oct. 2006).
Váša et al., "Geometry-Driven Local Neighborhood Based Predictors for Dynamic Mesh Compression," *Computer Graphics Forum*, vol. 29, No. 6, pp. 1921-1933 (Sep. 2010).
Wang et al., "Handling Occlusion and Large Displacement through Improved RGB-D Scene Flow Estimation," *IEEE Trans. on Circuits and Systems for Video Technology*, 14 pp. (Jul. 2015).
Waschbüsch et al., "Progressive Compression of Point-Sampled Models," *Eurographics Symp. on Point-Based Graphics*, 9 pp. (Jun. 2004).
Weiwei et al., "Fast Intra/Inter Frame Coding Algorithm for H.264/AVC," *Int'l Conf. on Signal Processing*, pp. 1305-1308 (May 2008).
Yuille et al., "A Mathematical Analysis of the Motion Coherence Theory," *Int'l Journal of Computer Vision*, vol. 3, pp. 155-175 (Jun. 1989).
Zhang et al., "Dense Scene Flow Based on Depth and Multi-channel Bilateral Filter," *Proc. $11^{th}$ Asian Conf. on Computer Vision*, pp. 140-151 (Nov. 2012).
Zhang et al., "Point Cloud Attribute Compression with Graph Transform," *IEEE Int'l Conf. on Image Processing*, 5 pp. (Oct. 2014).
Zhang et al., "Viewport: A Fully Distributed Immersive Teleconferencing System with Infrared Dot Pattern," Microsoft Research Technical Report, MSR-TR-2012-60, 11 pp. (Apr. 2012).
Chou, "Rate-Distortion Optimized Coder for Dynamic Voxelized Point Clouds," including attached document, MPEG 115th Meeting MPEG2016/m38675, 2 p. (May 25, 2016).
De Queiroz, "Motion-Compensated Compression of Dynamic Voxelized Point Clouds," *Trans. On Image Procesing*, 10 pp. (Apr. 2016).
International Search Report and Written Opinion dated Aug. 11, 2017, from International Patent Application No. PCT/US2017/033207, 18 pp.
Morell et al., "Geometric 3D Point Cloud Compression," Journal of Pattern Recognition Letters, Accepted Manuscript, 18 pp. (Dec. 2014).
MPEG "Geneva Meeting—Document Register", 115th MPEG Meeting, 26 pp. (Jul. 11, 2016).
Nahrstedt, "TEEVE: Tele-immersive Environment for EVErybody," downloaded from world Wide Web, 2 pp (downloaded Jul. 19, 2018).
Navarette et al., "3DCOMET: 3D Compression Methods Test Dataset," *Robotics and Autonomous Systems*, Accepted Manuscript, pp. 1-23 (Jul. 2015).
Office action dated Apr. 19, 2018, from U.S. Appl. No. 15/168,016, 15 pp.
Office action dated May 9, 2018, from U.S. Appl. No. 15/168,017, 19 pp.
Final Office Action dated Oct. 24, 2019, from U.S. Appl. No. 15/168,017, 23 pp.
Notice of Allowance dated Feb. 10, 2020, from U.S. Appl. No. 15/168,017, 8 pp.
Final Office Action dated Dec. 31, 2018, from U.S. Appl. No. 15/168,017, 18 pp.

(56) References Cited

OTHER PUBLICATIONS

Office Action dated May 30, 2019, from U.S. Appl. No. 15/168,017, 21 pp.

* cited by examiner software 1780 implementing one or more innovations for motion-compensated point cloud compression and/or voxel-distortion-error filtering, and/or corresponding decompression

MOTION-COMPENSATED COMPRESSION OF DYNAMIC VOXELIZED POINT CLOUDS

FIELD

The disclosed technology concerns compression schemes for voxelized point clouds as may be used in 3D communication systems, such as augmented-reality or virtual-reality systems.

BACKGROUND

With the emergence of inexpensive consumer electronic systems for both 3D capture and 3D rendering, visual communication is on the threshold of advancing beyond traditional 2D video to immersive 3D communication systems. Dynamic 3D scene capture can be implemented using color plus depth (RGBD) cameras, while 3D visualization can be implemented using stereoscopic monitors or near-eye displays to render the subject within a virtual or augmented reality. The processing for capture and display can be done in real time using powerful graphics processing units (GPUs). However, representing a complex, dynamic 3D scene generates a large amount of data. Compression is therefore a highly desirable part of enabling these emerging immersive 3D systems for communication.

Further, despite improvements in computer hardware, compression of 3D video is extremely time-consuming and resource-intensive in many encoding scenarios. Accordingly, improved compression methods that reduce computational complexity (including computational speed and resource usage) while still maintaining acceptable visual quality are highly desirable.

SUMMARY

In summary, the detailed description presents innovations for compressing 3D video data. The innovations described herein can help reduce the bit rate and/or distortion of 3D video encoding by selectively encoding one or more 3D-point-cloud blocks using an inter-frame coding (e.g., motion compensation) technique that allows for previously encoded/decoded frames to be used in predicting current frames being encoded. This reduction in the bit rate required for compression allows an encoder/decoder to more quickly perform compression/decompression of a point cloud frame and also reduces computational resource usage, both of which can be useful in real-time encoding/decoding scenarios. Alternatively, one or more 3D-point-cloud blocks can be encoded using an intra-frame encoding approach. The selection of which encoding mode to use can be based, for example, on a threshold that is evaluated relative to rate-distortion performance for both intra-frame and inter-frame encoding. Still further, embodiments of the disclosed technology can use one or more voxel-distortion-correction filters to correct distortion errors that may occur during voxel compression. Such filters are uniquely adapted for the particular challenges presented when compressing 3D image data. Corresponding decoding techniques are also disclosed herein.

Dynamic point clouds present a new frontier in visual communication systems. Although some advances have been made with respect to compression schemes for point clouds, few (if any) advances have been made with respect to using temporal redundancies as part of an effective point cloud compression scheme. Embodiments of the disclosed technology enable the encoding of dynamic voxelized point clouds at low bit rates. In embodiments of the disclosed technology, an encoder breaks the voxelized point cloud at each frame into 3D blocks (cubes) of voxels (also referred to as "3D-point-cloud blocks"). Each 3D-point-cloud block is either encoded in intra-frame mode or is replaced by a motion-compensated version of a 3D-point-cloud block in the previous frame. The decision can be based (at least in part) on a rate-distortion metric. In this way, both the geometry and the color can be encoded with distortion, allowing for reduced bit-rates. In certain embodiments, in-loop filtering is also employed to reduce (e.g., minimize) compression artifacts caused by distortion in the geometry information. Simulations reveal that embodiments of the disclosed motion compensated coder can efficiently extend the compression range of dynamic voxelized point clouds to rates below what intra-frame coding alone can accommodate, trading rate for geometry accuracy.

The innovations can be implemented as part of a method, as part of a computing device adapted to perform the method or as part of a tangible computer-readable media storing computer-executable instructions for causing a computing device to perform the method. The various innovations can be used in combination or separately.

The foregoing and other objects, features, and advantages of the invention will become more apparent from the following detailed description, which proceeds with reference to the accompanying figures.

DETAILED DESCRIPTION

I. General Considerations

The detailed description presents innovations in the area of encoding 3D video data, such as voxelized point clouds. The innovations described herein can help reduce the bit rate and/or distortion of 3D video encoding by selectively encoding one or more 3D-point-cloud block using an inter-frame coding (e.g., motion compensation) technique that allows for a previously encoded/decoded 3D-point-cloud block to be used in predicting 3D-point-cloud blocks in a current frame being encoded. This reduction in the bit rate required for compression allows an encoder/decoder to more quickly perform compression/decompression of a point cloud frame and also reduces computational resource usage, both of which can be useful in real-time encoding/decoding scenarios. Alternatively, one or more 3D-point-cloud blocks can be encoded using an intra-frame encoding approach. The selection of which encoding mode to use can be based, for example, on a threshold that is evaluated relative to rate-distortion performance for both intra-frame and inter-frame encoding. Still further, embodiments of the disclosed technology can use one or more voxel-distortion-correction filters to correct distortion errors that may occur during voxel compression. Such filters are uniquely adapted for the particular challenges presented when compressing 3D image data. Corresponding decoding techniques are also disclosed herein.

Although operations described herein are in places described as being performed by a video encoder or decoder, in many cases the operations can be performed by another type of media processing tool (e.g., image encoder or decoder).

Various alternatives to the examples described herein are possible. For example, some of the methods described herein can be altered by changing the ordering of the method acts described, by splitting, repeating, or omitting certain method acts, etc. The various aspects of the disclosed technology can be used in combination or separately. Different embodiments use one or more of the described innovations. Some of the innovations described herein address one or more of the problems noted in the background. Typically, a given technique/tool does not solve all such problems.

As used in this application and in the claims, the singular forms "a," "an," and "the" include the plural forms unless the context clearly dictates otherwise. Additionally, the term "includes" means "comprises." Further, as used herein, the term "and/or" means any one item or combination of any items in the phrase.

II. Example Computing Systems

Figure 17:
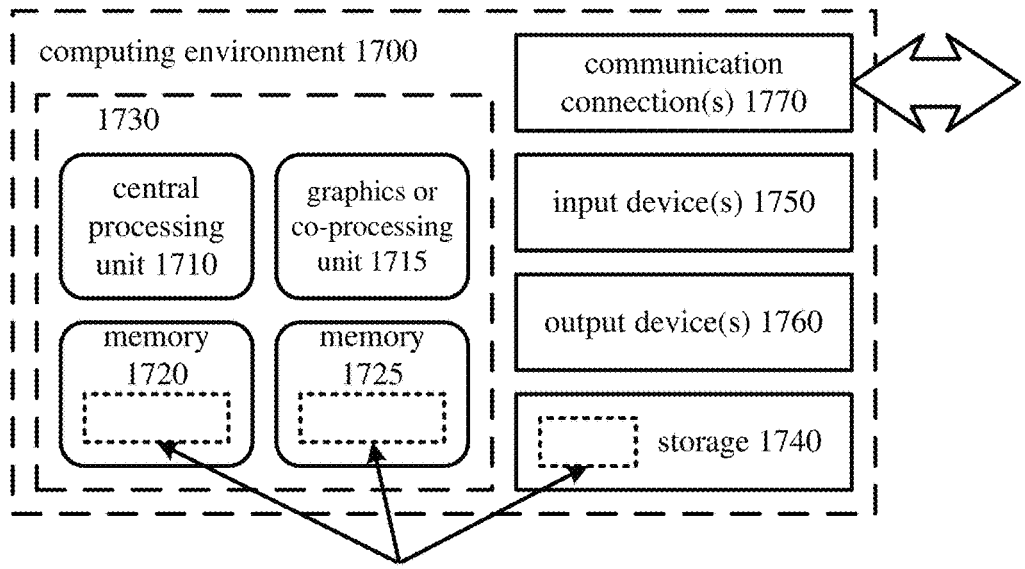
FIG. 17 is a diagram of an example computing system in which some described embodiments can be implemented.

FIG. 17 illustrates a generalized example of a suitable computer system (1700) in which several of the described innovations may be implemented. The computer system (1700) is not intended to suggest any limitation as to scope of use or functionality, as the innovations may be implemented in diverse general-purpose or special-purpose computer systems.

With reference to FIG. 17, the computer system (1700) includes one or more processing units (1710, 1715) and memory (1720, 1725). The processing units (1710, 1715) execute computer-executable instructions. A processing unit can be a general-purpose central processing unit ("CPU"), processor in an application-specific integrated circuit ("ASIC") or any other type of processor. In a multi-processing system, multiple processing units execute computer-executable instructions to increase processing power. For example, FIG. 17 shows a CPU (1710) as well as a graphics processing unit or co-processing unit (1715). The tangible memory (1720, 1725) may be volatile memory (e.g., registers, cache, RAM), non-volatile memory (e.g., ROM, EEPROM, flash memory, etc.), or some combination of the two, accessible by the processing unit(s). The memory (1720, 1725) stores software (1780) implementing one or more of the disclosed innovations for point cloud compression with motion compensation and/or filtering to help correct voxel distortion errors, and corresponding decompression, in the form of computer-executable instructions suitable for execution by the processing unit(s).

A computer system may have additional features. For example, the computer system (1700) includes storage (1740), one or more input devices (1750), one or more output devices (1760), and one or more communication connections (1770). An interconnection mechanism (not shown) such as a bus, controller, or network interconnects the components of the computer system (1700). Typically, operating system software (not shown) provides an operating environment for other software executing in the computer system (1700), and coordinates activities of the components of the computer system (1700).

The tangible storage (1740) may be removable or non-removable, and includes magnetic media such as magnetic disks, magnetic tapes or cassettes, optical media such as CD-ROMs or DVDs, or any other medium which can be used to store information and which can be accessed within the computer system (1700). The storage (1740) stores instructions for the software (1780) implementing one or more of the disclosed innovations for point cloud compression with motion compensation and/or filtering to help correct voxel distortion errors, and corresponding decompression.

The input device(s) (1750) may be a touch input device such as a keyboard, mouse, pen, or trackball, a voice input device, a scanning device, or another device that provides input to the computer system (1700). For point cloud data, the input device(s) (1750) may be a set of depth cameras or similar devices that capture video input used to derive point cloud data, or a CD-ROM or CD-RW that reads point cloud data into the computer system (1700). The output device(s)

(1760) may be a display, printer, speaker, CD-writer, or other device that provides output from the computer system (1700). For rendering of views of reconstructed point cloud data, the output device(s) (1760) may be special glasses or other such near-eye display (e.g., an augmented-reality or virtual-reality headset), a stereoscopic display, or another viewing apparatus, to show the reconstructed point cloud data within a real scene or a synthetic scene.

The communication connection(s) (1770) enable communication over a communication medium to another computing entity. The communication medium conveys information such as computer-executable instructions, point cloud data input or encoded point could data output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-readable media. Computer-readable media are any available tangible media that can be accessed within a computing environment. By way of example, and not limitation, with the computer system (1700), computer-readable media include memory (1720, 1725), storage (1740), and combinations thereof. Thus, the computer-readable media can be, for example, volatile memory, non-volatile memory, optical media, or magnetic media. As used herein, the term computer-readable media does not include transitory signals or propagating carrier waves.

The innovations can be described in the general context of computer-executable instructions, such as those included in program modules, being executed in a computer system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computer system.

The terms "system" and "device" are used interchangeably herein. Unless the context clearly indicates otherwise, neither term implies any limitation on a type of computer system or computing device. In general, a computer system or computing device can be local or distributed, and can include any combination of special-purpose hardware and/or general-purpose hardware with software implementing the functionality described herein.

The disclosed methods can also be implemented using specialized computing hardware configured to perform any of the disclosed methods. For example, the disclosed methods can be implemented by an integrated circuit (e.g., an ASIC such as an ASIC digital signal processor ("DSP"), a graphics processing unit ("GPU"), or a programmable logic device ("PLD") such as a field programmable gate array ("FPGA")) specially designed or configured to implement any of the disclosed methods.

For the sake of presentation, the detailed description uses terms like "select" and "determine" to describe computer operations in a computer system. These terms are high-level abstractions for operations performed by a computer, and should not be confused with acts performed by a human being. The actual computer operations corresponding to these terms vary depending on implementation.

III. Example Network Environments

Figure 18A:
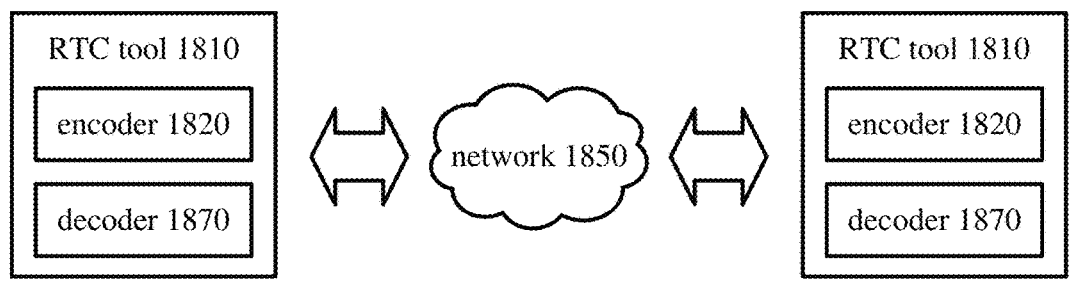
FIGS. 18a and 18b are diagrams of example network environments in which some described embodiments can be implemented.
Figure 18B:
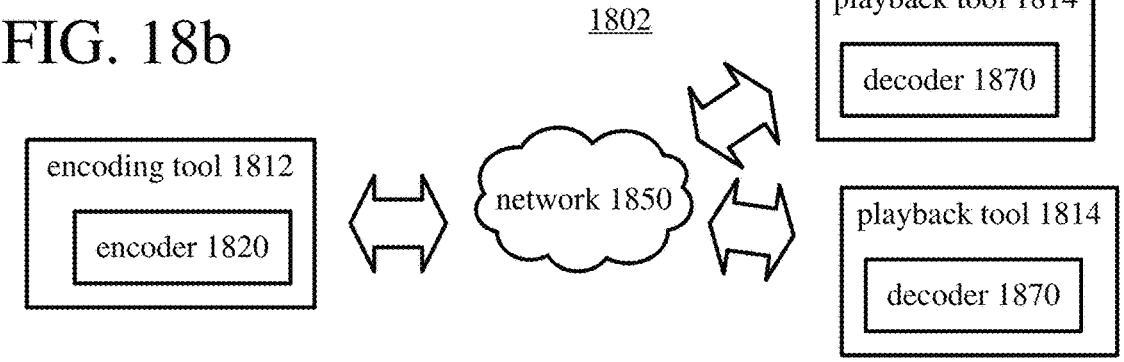

FIGS. 18a and 18b show example network environments (1801, 1802) that include encoders (1820) and decoders (1870). The encoders (1820) and decoders (1870) are connected over a network (1850) using an appropriate communication protocol. The network (1850) can include the Internet or another computer network.

In the network environment (1801) shown in FIG. 18a, each real-time communication ("RTC") tool (1810) includes both an encoder (1820) and a decoder (1870) for bidirectional communication. A given encoder (1820) can receive 3D image data (e.g., point cloud data) and produce, as output, encoded data compliant with a particular format, with a corresponding decoder (1870) accepting encoded data from the encoder (1820) and decoding it to reconstruct the 3D image data (e.g., point cloud data). The bidirectional communication can be part of a conference or other two-party or multi-party communication scenario. Although the network environment (1801) in FIG. 18a includes two real-time communication tools (1810), the network environment (1801) can instead include three or more real-time communication tools (1810) that participate in multi-party communication.

Figure 19A:
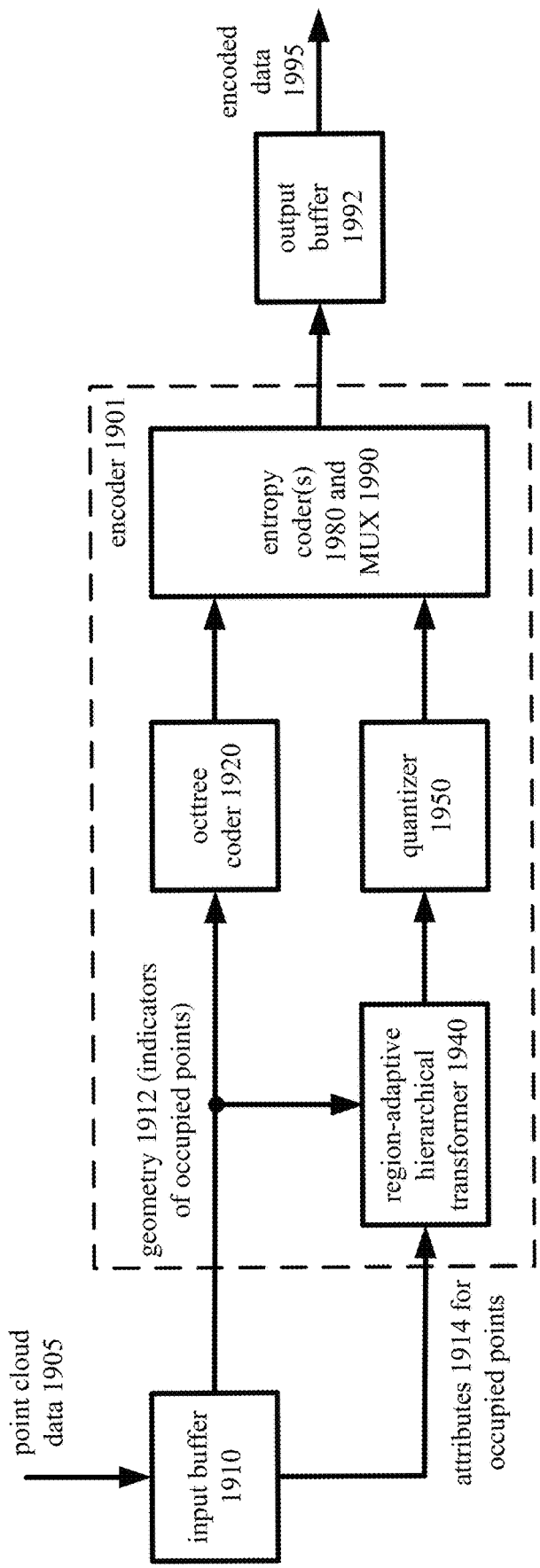
FIGS. 19a and 19b are diagrams illustrating example encoders in conjunction with which some described embodiments can be implemented.
Figure 19B:
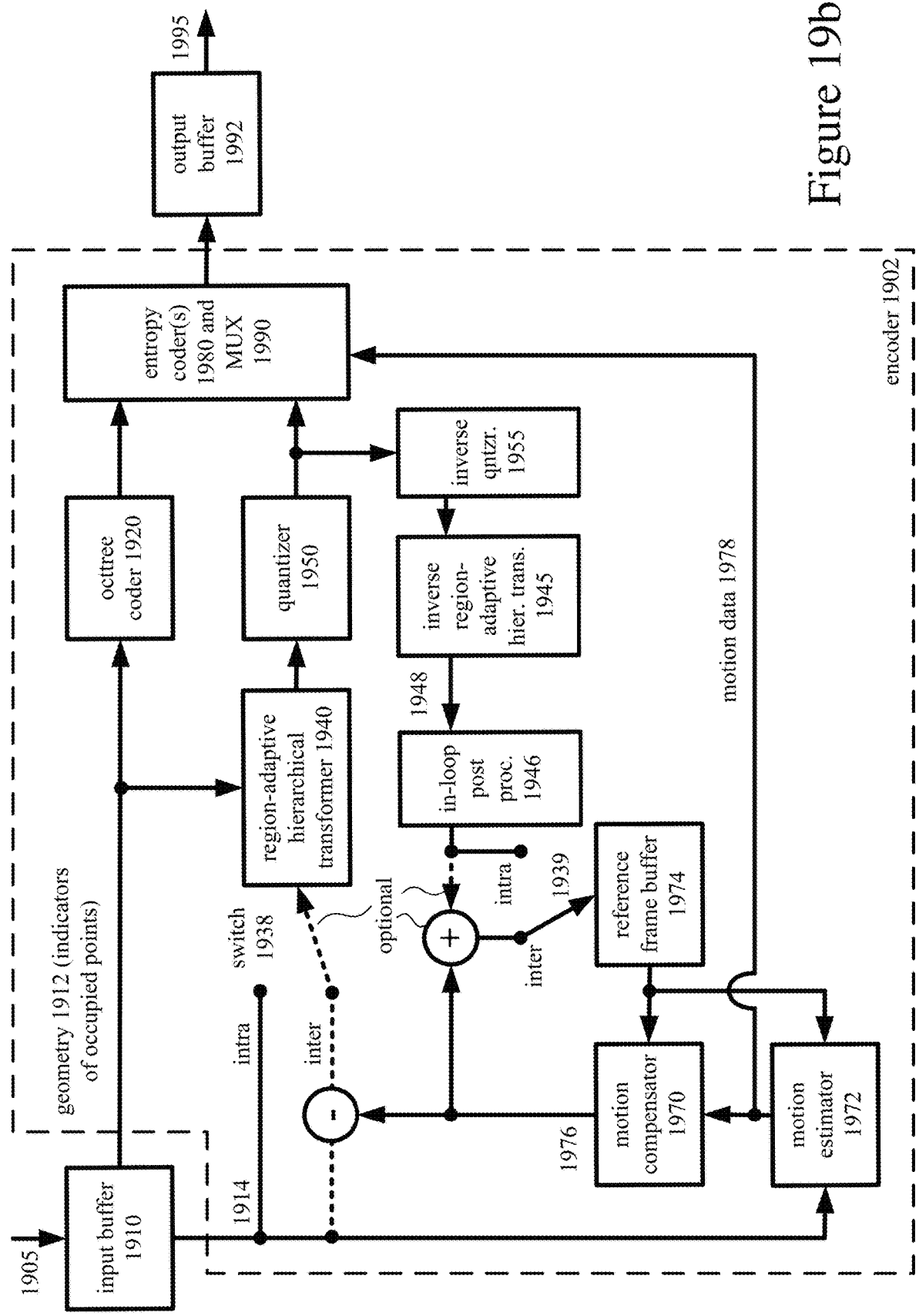
Figure 20A:
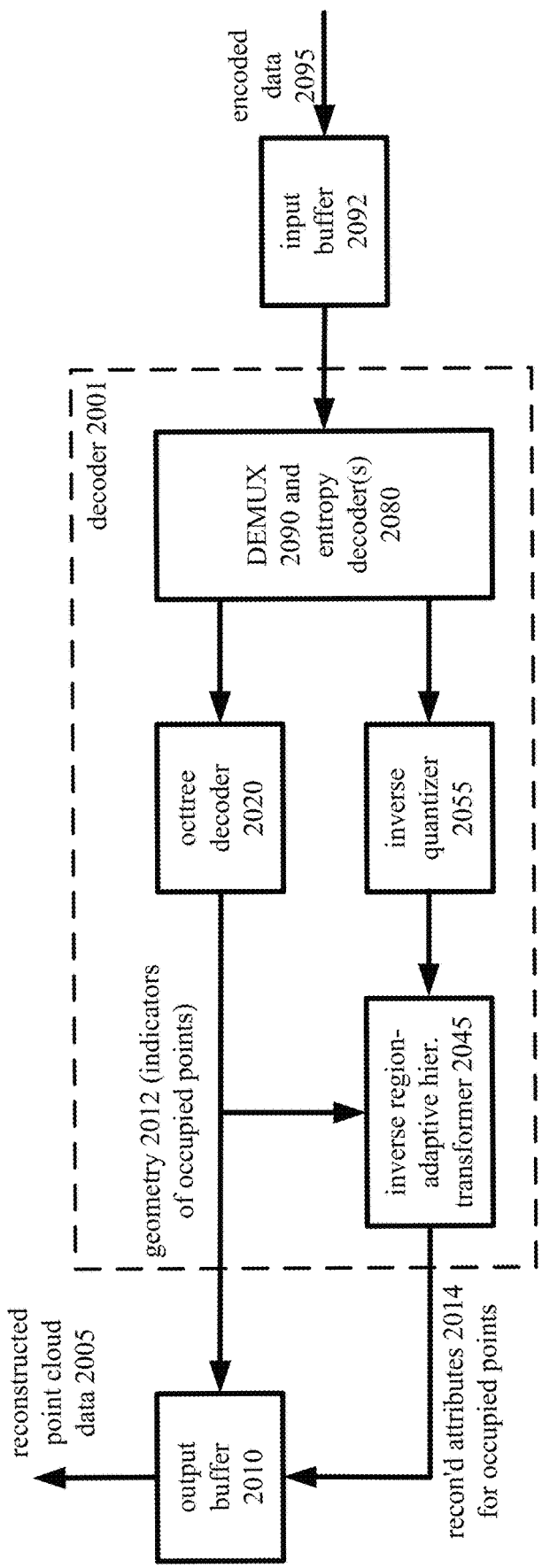
FIGS. 20a and 20b are diagrams illustrating example decoders in conjunction with which some described embodiments can be implemented
Figure 20B:
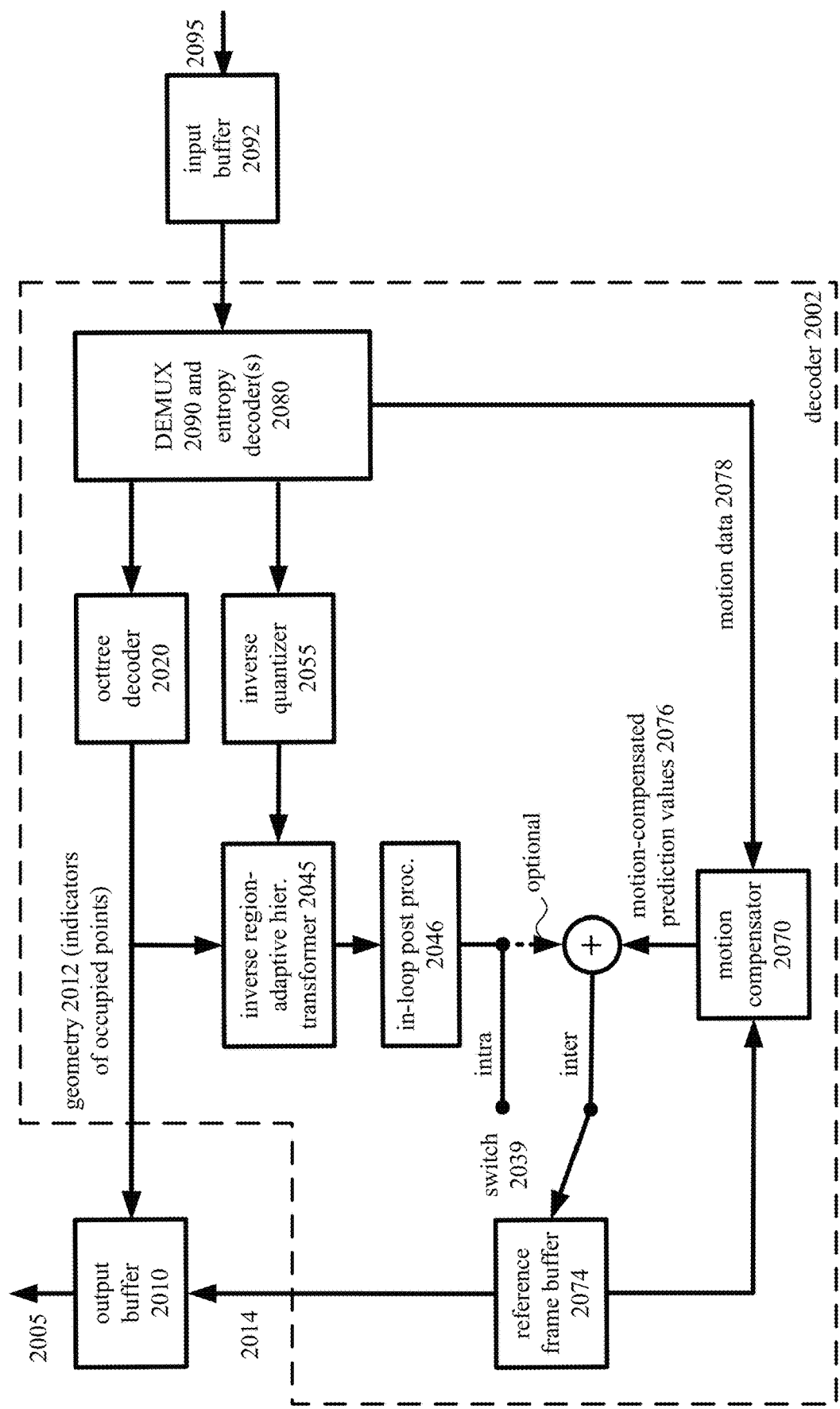

A real-time communication tool (1810) manages encoding by an encoder (1820). FIGS. 19a and 19b show example encoders (1901, 1902) that can be included in the real-time communication tool (1810). Alternatively, the real-time communication tool (1810) uses another encoder. A real-time communication tool (1810) also manages decoding by a decoder (1870). FIGS. 20a and 20b show example decoders (2001, 2002) that can be included in the real-time communication tool (1810). Alternatively, the real-time communication tool (1810) uses another decoder. A real-time communication tool (1810) can also include one or more encoders and one or more decoders for other media (e.g., audio).

A real-time communication tool (1810) can also include one or more capture components (not shown) that construct point cloud data based in input video received from capture devices (e.g., depth cameras). For example, the capture component(s) generate a series of frames of point cloud data for one or more objects depicted in the input video. For a given point cloud frame, the capture component(s) process multiple video images from different perspectives of the objects (e.g., 8 video images from different perspectives surrounding the objects) to generate a point cloud in 3D space. For typical frame rates of video capture (such as 15 or 30 frames per second), frames of point cloud data can be generated in real time and provided to the encoder (1820).

A real-time communication tool (1810) can also include one or more rendering components (not shown) that render views of reconstructed point cloud data. For example, the rendering component(s) generate a view of reconstructed point cloud data, from a perspective in the 3D space, for rendering in special glasses, near-eye display, stereoscopic display, or another rendering apparatus. Views of reconstructed point cloud data can be generated in real time as the perspective changes and as new point cloud data is reconstructed.

In the network environment (1802) shown in FIG. 18b, an encoding tool (1812) includes an encoder (1820) that receives point cloud data and encodes it for delivery to multiple playback tools (1814), which include decoders (1870). The unidirectional communication can be provided for entertainment, surveillance or monitoring, remote conferencing presentation or sharing, gaming, or other scenario in which point cloud data is encoded and sent from one location to one or more other locations. Although the network environment (1802) in FIG. 18b includes two playback tools (1814), the network environment (1802) can include more or fewer playback tools (1814). In general, a playback tool (1814) communicates with the encoding tool (1812) to determine a stream of point cloud data for the playback tool (1814) to receive. The playback tool (1814) receives the stream, buffers the received encoded data for an appropriate period, and begins decoding and playback.

FIGS. 19a and 19b show example encoders (1901, 1902) that can be included in the encoding tool (1812). Alternatively, the encoding tool (1812) uses another encoder. The encoding tool (1812) can also include server-side controller logic for managing connections with one or more playback tools (1814). An encoding tool (1812) can also include one or more encoders for other media (e.g., audio) and/or capture components (not shown). A playback tool (1814) can include client-side controller logic for managing connections with the encoding tool (1812). FIGS. 20a and 20b show example decoders (2001, 2002) that can be included in the playback tool (1814). Alternatively, the playback tool (1814) uses another decoder. A playback tool (1814) can also include one or more decoders for other media (e.g., audio) and/or rendering components (not shown).

IV. Example Encoders

Figure 4:
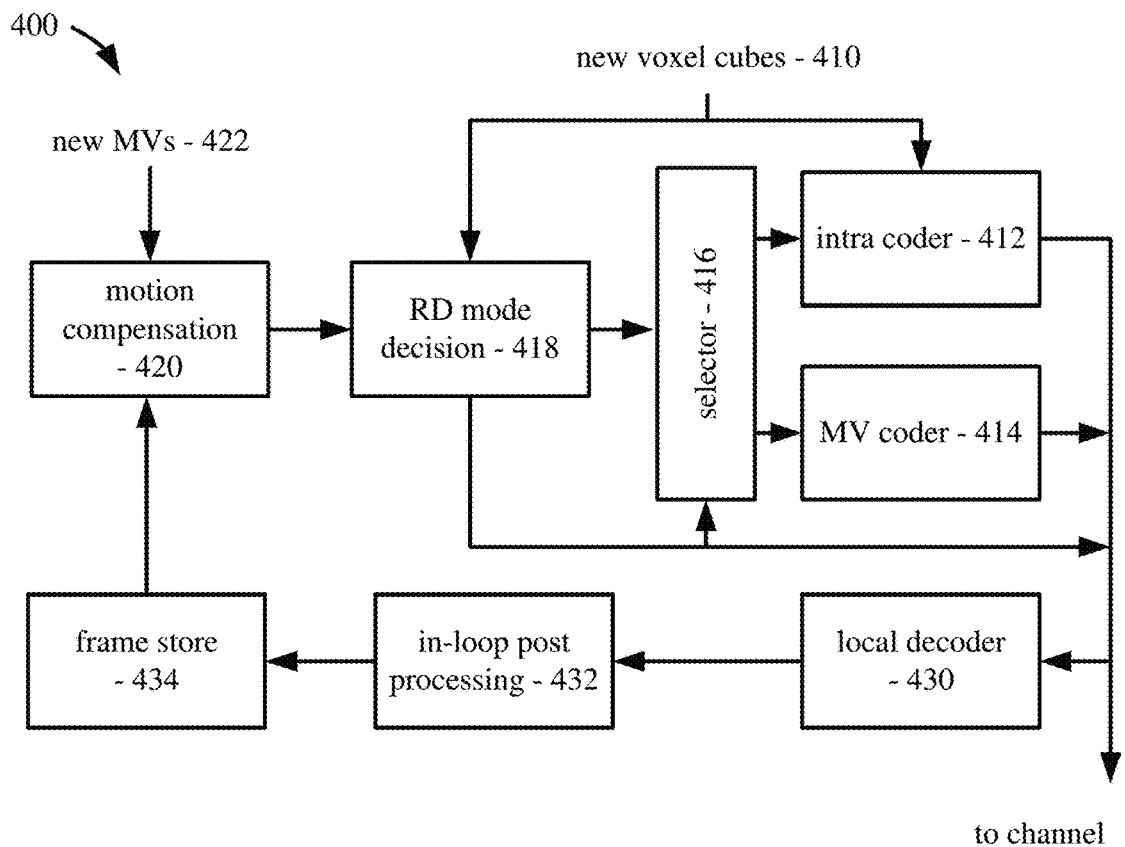
FIG. 4 is a schematic block diagram of an example coder in accordance with embodiments of the disclosed technology.

FIGS. 19a and 19b show example encoders (1901, 1902) in conjunction with which some described embodiments may be implemented. The encoder (1901) of FIG. 19a is used for intra-frame compression of a 3D-point-cloud block, which exploits spatial redundancy in point cloud data. The encoder (1901) of FIG. 19a can be used iteratively to compress individual 3D-point-cloud blocks from frames of point cloud data in a time series. Or, the encoder (1902) of FIG. 19b can be used for inter-frame compression of a 3D-point-cloud block in a time series of point cloud frames, which also exploits temporal redundancy between the point cloud frames in the time series. FIG. 4 shows one example of an encoder in accordance with embodiments of the disclosed technology where intra-frame vs. inter-frame compression schemes are adaptively selected for encoding particular 3D blocks during compression (e.g., during real-time compression).

Each of the encoders (1901, 1902) can be part of a general-purpose encoding tool capable of operating in any of multiple encoding modes such as a low-latency encoding mode for real-time communication and a higher-latency encoding mode for producing media for playback from a file or stream, or it can be a special-purpose encoding tool adapted for one such encoding mode. Each of the encoders (1901, 1902) can be implemented as part of an operating system module, as part of an application library, as part of a standalone application, or using special-purpose hardware.

The input buffer (1910) is memory configured to receive and store point cloud data (1905). The input buffer (1910) receives point cloud data (1905) from a source. The source can be one or more capture components that receive input video from a set of cameras (e.g., depth cameras) or other digital video source. The source produces a sequence of frames of point cloud data at a rate of, for example, 30 frames per second. As used herein, the term "frame of point cloud data" or "point cloud frame" (or sometimes just "frame") generally refers to source, coded or reconstructed point cloud data at a given instance of time. A point cloud frame can depict an entire model of objects in a 3D space at a given instance of time. Or, a point cloud frame can depict a single object or region of interest in the 3D space at a given instance of time.

In the input buffer (1910), the point cloud data (1905) includes geometry data (1912) for points as well as attributes (1914) of occupied points. The geometry data (1912) includes indicators of which of the points of the point cloud data (1905) are occupied. For example, for each of the points of the point cloud data (1905), a flag value indicates whether or not the point is occupied. Alternatively, a point of the point cloud can be implicitly flagged as occupied simply by virtue of being included in a list of occupied points. An occupied point has one or more attributes (1914) in the point cloud data (1905). The attributes (1914) associated with occupied points depend on implementation (e.g., data produced by capture components, data processed by rendering components). For example, the attribute(s) for an occupied point can include: (1) one or more sample values each defining, at least in part, a color associated with the occupied point (e.g., YUV sample values, RGB sample values, or sample values in some other color space); (2) an opacity value defining, at least in part, an opacity associated with the occupied point; (3) a specularity value defining, at least in part, a specularity coefficient associated with the occupied point; (4) one or more surface normal values defining, at least in part, direction of a flat surface associated with the occupied point; (5) a light field defining, at least in part, a set of light rays passing through or reflected from the occupied point; and/or (6) a motion vector defining, at least in part, motion associated with the occupied point. Alternatively, attribute(s) for an occupied point include other and/or additional types of information. During later stages of encoding with the encoder (1902) of FIG. 19b, the transformed value(s) for an occupied point can also include: (7) one or more sample values each defining, at least in part, a residual associated with the occupied point.

An arriving point cloud frame is stored in the input buffer (1910). The input buffer (1910) can include multiple frame storage areas. After one or more of the frames have been stored in input buffer (1910), a selector (not shown) selects an individual point cloud frame to encode as the current point cloud frame. The order in which frames are selected by the selector for input to the encoder (1901, 1902) may differ from the order in which the frames are produced by the capture components, e.g., the encoding of some frames may be delayed in order, so as to allow some later frames to be encoded first and to thus facilitate temporally backward prediction. Before the encoder (1901, 1902), the system can include a pre-processor (not shown) that performs pre-processing (e.g., filtering) of the current point cloud frame before encoding. The pre-processing can include color space conversion into primary (e.g., luma) and secondary (e.g., chroma differences toward red and toward blue) components, resampling, and/or other filtering.

In general, a volumetric element, or voxel, is a set of one or more co-located attributes for a location in 3D space. For purposes of encoding, attributes can be grouped on a voxel-by-voxel basis. Or, to simplify implementation, attributes can be grouped for encoding on an attribute-by-attribute basis (e.g., encoding a first component plane for luma (Y) sample values for points of the frame, then encoding a second component plane for first chroma (U) sample values for points of the frame, then encoding a third component plane for second chroma (V) sample values for points of the frame, and so on). Typically, the geometry data (1912) is the same for all attributes of a point cloud frame—each occupied point has values for the same set of attributes. Alternatively, however, different occupied points can have different sets of attributes.

The encoder (1901, 1902) can include a tiling module (not shown) that partitions a point cloud frame into tiles of the same size or different sizes. For example, the tiling module splits the frame along tile rows, tile columns, etc. that, with frame boundaries, define boundaries of tiles within the frame, where each tile is a rectangular prism region. Tiles can be used to provide options for parallel processing or spatial random access. The content of a frame or tile can be further partitioned into blocks or other sets of points for purposes of encoding and decoding. In general, a "block" of point cloud data (also referred to as a "3D-point-cloud block") is a set of points in an x×y×z rectangular prism. Points of the block may be occupied or not occupied. When attributes are organized in an attribute-by-attribute manner, the values of one attribute for occupied points of a block can be grouped together for processing.

The encoder (1901, 1902) also includes a general encoding control (not shown), which receives the current point cloud frame as well as feedback from various modules of the encoder (1901, 1902). Overall, the general encoding control provides control signals to other modules (such as the intra/inter switch (1938), tiling module, transformer (1940), inverse transformer (1945), quantizer (1950), inverse quantizer (1955), motion estimator (1972), and entropy coder(s) (1980)) to set and change coding parameters during encoding. The general encoding control can evaluate intermediate results during encoding, typically considering bit rate costs and/or distortion costs for different options. In particular, in the encoder (1902) of FIG. 19b, the general encoding control decides whether to use intra-frame compression or inter-frame compression for attributes of occupied points in blocks of the current point cloud frame. For example, any of the compression mode selection techniques described below in Section VI.D can be used. The general encoding control produces general control data that indicates decisions made during encoding, so that a corresponding decoder can make consistent decisions. The general control data is provided to the multiplexer (1990).

With reference to FIG. 19a, the encoder (1901) receives point cloud data (1905) from the input buffer (1910) and produces encoded data (1995) using intra-frame compression, for output to the output buffer (1992). The encoder (1901) includes an octtree coder (1920), a region-adaptive hierarchical transformer (1940), a quantizer (1950), one or more entropy coders (1980), and a multiplexer (1990).

As part of receiving the encoded data (1905), the encoder (1901) receives the geometry data (1912), which is passed to the octtree coder (1920) and region-adaptive hierarchical transformer (1940). The octtree coder (1920) compresses the geometry data (1912). For example, the octtree coder (1920) applies lossless compression to the geometry data (1912). Alternatively, the octtree coder (1920) compresses the geometry data (1912) in some other way (e.g., lossy compression, in which case a reconstructed version of the geometry data (1912) is passed to the region-adaptive hierarchical transformer (1940) instead of the original geometry data (1912)). The octtree coder (1920) passes the compressed geometry data to the multiplexer (1990), which formats the compressed geometry data to be part of the encoded data (1995) for output.

As part of receiving the encoded data (1905), the encoder (1901) also receives the attributes (1914), which are passed to the region-adaptive hierarchical transformer (1940). The region-adaptive hierarchical transformer (1940) uses the received geometry data (1912) when deciding how to apply a RAHT to attributes (1914). For example, the region-adaptive hierarchical transformer (1940) applies a RAHT to the attributes (1914) of occupied points. Alternatively, the region-adaptive hierarchical transformer (1940) applies a RAHT that is region-adaptive (processing attributes for occupied points) and hierarchical (passing coefficients from one level to another level for additional processing) in some other way. The region-adaptive hierarchical transformer (1940) passes the transform coefficients resulting from the RAHT to the quantizer (1950).

The quantizer (1950) quantizes the transform coefficients. For example, the quantizer (1950) applies uniform scalar quantization to the transform coefficients. Alternatively, the quantizer (1950) applies quantization in some other way. The quantizer (1950) can change the quantization step size on a frame-by-frame basis. Alternatively, the quantizer (1950) can change the quantization step size on a tile-by-tile basis, block-by-block basis, or other basis.

The quantization step size can depend on a quantization parameter ("QP"), whose value is set for a frame, tile, block, and/or other portion of point cloud data. The quantizer (1950) passes the quantized transform coefficients to the one or more entropy coders (1980).

The entropy coder(s) (1980) entropy code the quantized transform coefficients. When entropy coding the quantized transform coefficients, the entropy coder(s) (1980) can use arithmetic coding, run-length Golomb-Rice coding, or some other type of entropy coding (e.g., Exponential-Golomb coding, variable length coding, dictionary coding). Alternatively, the entropy coder(s) (1980) apply some other form of adaptive or non-adaptive entropy coding to the quantized transform coefficients. The entropy coder(s) (1980) can also encode general control data, QP values, and other side information (e.g., mode decisions, parameter choices). For the encoder (1902) of FIG. 19b, the entropy coder(s) (1980) can encode motion data (1978). The entropy coder(s) (1980) can use different coding techniques for different kinds of information, and they can apply multiple techniques in combination. The entropy coder(s) (1980) pass the results of the entropy coding to the multiplexer (1990), which formats the coded transform coefficients and other data to be part of the encoded data (1995) for output. When the entropy coder(s) (1980) use parameters to adapt entropy coding (e.g., estimates of distribution of quantized transform coefficients for buckets), the entropy coder(s) (1980) may also code the parameters and pass them to the multiplexer (1990), which formats the coded parameters to be part of the encoded data (1995).

With reference to FIG. 19b, the encoder (1902) further includes an inverse quantizer (1955), inverse region-adaptive hierarchical transformer (1945), motion compensator (1970), motion estimator (1972), reference frame buffer (1974), and intra/inter switch (1938). The octtree coder (1920) operates as in the encoder (1901) of FIG. 19a. The region-adaptive hierarchical transformer (1940), quantizer (1950), and entropy coder(s) (1980) of the encoder (1902) of FIG. 19b essentially operate as in the encoder (1901) of FIG. 19a, but may process residual values for any of the attributes of occupied points.

When a block of the current point cloud frame is compressed using inter-frame compression, the motion estimator (1972) estimates the motion of attributes of the block with respect to one or more reference frames of point cloud data. The current point cloud frame can be entirely or partially coded using inter-frame compression. The reference frame buffer (1974) buffers one or more reconstructed previously coded/decoded point cloud frames for use as reference frames. When multiple reference frames are used, the multiple reference frames can be from different temporal directions or the same temporal direction. As part of the general control data, the encoder (1902) can include information that indicates how to update the reference frame buffer (1974), e.g., removing a reconstructed point cloud frame, adding a newly reconstructed point cloud frame.

The motion estimator (1972) produces motion data (1978) as side information. The motion data (1978) can include motion vector ("MV") data and reference frame selection data. The motion data (1978) is provided to one of the entropy coder(s) (1980) or the multiplexer (1990) as well as the motion compensator (1970). The motion compensator (1970) applies MV(s) for a block to the reconstructed reference frame(s) from the reference frame buffer (1974). For the block, the motion compensator (1970) produces a motion-compensated prediction, which is a region of attributes in the reference frame(s) that are used to generate motion-compensated prediction values (1976) for the block.

As shown in FIG. 19b, the intra/inter switch (1938) selects whether a given block is compressed using intra-frame compression or inter-frame compression. Intra/inter switch (1938) decisions for blocks of the current point cloud frame can be made using various criteria.

When inter-frame compression is used for a block, the encoder (1902) can determine whether or not to encode and transmit the differences (if any) between prediction values (1976) and corresponding original attributes (1914). The differences (if any) between the prediction values (1976) and corresponding original attributes (1914) provide values of the residual. If encoded/transmitted, the values of the prediction residual are encoded using the region-adaptive hierarchical transformer (1940), quantizer (1950), and entropy coder(s) (1980), as described above, with reference to FIG. 19a. (In practice, calculating the differences between the prediction values (1976) and corresponding original attributes (1914) may be difficult because the number of points in the prediction block and original block may not be the same. In this case, since simple arithmetic differencing is not possible on a point-by-point basis, the original attributes can be subtracted from estimates of corresponding prediction values. Or, to avoid this problem, the prediction residual values are not encoded at all. In this case, paths and components of the encoder (1902) used to determine the prediction residual values and add reconstructed residual values to prediction values (1976) can be omitted. Such paths and components, including the differencing module, switch (1938), and addition module, are shown as optional in FIG. 19b.)

In the encoder (1902) of FIG. 19b, a decoding process emulator implements some of the functionality of a decoder. The decoding process emulator determines whether a given frame needs to be reconstructed and stored for use as a reference frame for inter-frame compression of subsequent frames. For reconstruction, the inverse quantizer (1955) performs inverse quantization on the quantized transform coefficients, inverting whatever quantization was applied by the quantizer (1950). The inverse region-adaptive hierarchical transformer (1945) performs an inverse RAHT, inverting whatever RAHT was applied by the region-adaptive hierarchical transformer (1940), and thereby producing blocks of reconstructed residual values (if inter-frame compression was used) or reconstructed attributes (if intra-frame compression was used). When inter-frame compression has been used (inter path at switch (1939)), reconstructed residual values, if any, are combined with the prediction values (1976) to produce a reconstruction (1948) of the attributes of occupied points for the current point cloud frame. (If the encoder (1902) does not encode prediction residual values, for reasons explained above, the prediction values (1976) can be directly used as the reconstructed attributes (1948), bypassing the addition component.) When intra-frame compression has been used (intra path at switch (1939)), the encoder (1902) uses the reconstructed attributes (1948) produced by the inverse region-adaptive hierarchical transformer (1945). The reference frame buffer (1974) stores the reconstructed attributes (1948) for use in motion-compensated prediction of attributes of subsequent frames. The reconstructed attributes (1948) can be further filtered by an in-loop post-processing unit (1946) (e.g., one or more voxel-distortion-correction filters, such as any of the filters described in more detail below (for instance, those described in Section VI.D.5), can be applied). A filtering control (not shown) can determine how the in-loop post-processing unit (1946) performs filtering on reconstructed attributes (1948), and one or more filters associated with the in-loop post-processing unit (1946) can perform the filtering. The filtering control can produce filter control data, which is provided to the entropy coder(s) (1980) and multiplexer (1990).

The output buffer (1992) is memory configured to receive and store the encoded data (1995). The encoded data (1995) that is aggregated in the output buffer (1990) can also include metadata relating to the encoded data. The encoded data can be further processed by a channel encoder (not shown), which can implement one or more media system multiplexing protocols or transport protocols. The channel encoder provides output to a channel (not shown), which represents storage, a communications connection, or another channel for the output.

Depending on implementation and the type of compression desired, modules of the encoders (1901, 1902) can be added, omitted, split into multiple modules, combined with other modules, and/or replaced with like modules. In alternative embodiments, encoders with different modules and/or other configurations of modules perform one or more of the described techniques. Specific embodiments of encoders typically use a variation or supplemented version of one of the encoders (1901, 1902). The relationships shown between modules within the encoders (1901, 1902) indicate general flows of information in the respective encoders (1901, 1902); other relationships are not shown for the sake of simplicity. In general, a given module of the encoders (1901, 1902) can be implemented by software executable on a CPU, by software controlling special-purpose hardware (e.g., graphics hardware for video acceleration), or by special-purpose hardware (e.g., in an ASIC).

V. Example Decoders

FIGS. 20a and 20b show example decoders (2001, 2002) in conjunction with which some described embodiments may be implemented. The decoder (2001) of FIG. 20a is used for intra-frame decompression of a 3D-point-cloud block, and it can be used iteratively to decompress 3D-point-cloud blocks in individual frames of point cloud data in a time series. Or, the decoder (2002) of FIG. 20b can be used for inter-frame decompression of a 3D-point-cloud block in a time series of point cloud frames.

Each of the decoders (2001, 2002) can be a general-purpose decoding tool capable of operating in any of multiple decoding modes such as a low-latency decoding mode for real-time communication and a higher-latency decoding mode for media playback from a file or stream, or it can be a special-purpose decoding tool adapted for one such decoding mode. Each of the decoders (2001, 2002) can be implemented as part of an operating system module, as part of an application library, as part of a standalone application or using special-purpose hardware.

The input buffer (2092) is memory configured to receive and store encoded data (2095). The input buffer (2092) receives the encoded data (2095) from a channel, which can represent storage, a communications connection, or another channel for encoded data as input. The channel produces encoded data (2095) that has been channel coded. A channel decoder (not shown), implementing one or more media system demultiplexing protocols or transport protocols, can process the channel coded data. The encoded data (2095) that is output from the channel decoder is stored in the input buffer (2092) until a sufficient quantity of such data has been received. The encoded data (2095) that is aggregated in the input buffer (2092) can include metadata relating to the encoded data. In general, the input buffer (2092) temporarily stores encoded data (2095) until such encoded data (2095) is used by the decoder (2001, 2002). At that point, encoded data for a coded point cloud frame is transferred from the input buffer (2092) to the decoder (2001, 2002). As decoding continues, new encoded data (2095) is added to the input buffer (2092) and the oldest encoded data (2095) remaining in the input buffer (2092) is transferred to the decoder (2001, 2002).

In the input buffer (2092), the encoded data (2095) includes encoded data for geometry data (2012) as well as encoded data for attributes (2014) of occupied points. The geometry data (2012) includes indicators of which of the points of the reconstructed point cloud data (2005) are occupied (that is, have at least one attribute). For example, for each of the points, a flag value indicates whether or not the point is occupied. An occupied point has one or more attributes (2014) in the reconstructed point cloud data (2005). The attributes (2014) associated with occupied points depend on implementation (e.g., data produced by capture components, data processed by rendering components). For example, the attribute(s) for an occupied point can include: (1) one or more sample values each defining, at least in part, a color associated with the occupied point (e.g., YUV sample values, RGB sample values, or sample values in some other color space); (2) an opacity value defining, at least in part, an opacity associated with the occupied point; (3) a specularity value defining, at least in part, a specularity coefficient associated with the occupied point; (4) one or more surface normal values defining, at least in part, direction of a flat surface associated with the occupied point; (5) a light field defining, at least in part, a set of light rays passing through or reflected from the occupied point; and/or (6) a motion vector defining, at least in part, motion associated with the occupied point. Alternatively, attribute(s) for an occupied point include other and/or additional types of information. For decoding with the decoder (2002) of FIG. 20b, the transform value(s) for an occupied point can also include: (7) one or more sample values each defining, at least in part, a residual associated with the occupied point.

For purposes of decoding, attributes can be grouped on a voxel-by-voxel basis. Or, to simplify implementation, attributes can be grouped for decoding on an attribute-by-attribute basis (e.g., decoding a first component plane for luma (Y) sample values for points of the frame, then decoding a second component plane for first chroma (U) sample values for points of the frame, then decoding a third component plane for second chroma (V) sample values for points of the frame, and so on). Typically, the geometry data (2012) is the same for all attributes of a point cloud frame—each occupied point has values for the same set of attributes. Alternatively, however, different occupied points can have different sets of attributes.

With reference to FIG. 20a, the decoder (2001) receives encoded data (2095) from the input buffer (2092) and produces reconstructed point cloud data (2005) using intra-frame decompression, for output to the output buffer (2010). The decoder (2001) includes an octtree decoder (2020), an inverse region-adaptive hierarchical transformer (2045), an inverse quantizer (2055), one or more entropy coders (2080), and a demultiplexer (2090). For purposes of decoding, a point cloud frame can be organized into multiple tiles of the same size or different sizes. The content of a point cloud frame or tile can be further organized as blocks or other sets of sample values.

The demultiplexer (2090) receives encoded data (2095) and parses elements of the encoded data (2095) from a bitstream. The demultiplexer (2090) makes the received encoded data (2095) available to one or more entropy decoders (2080) and/or other modules of the decoder (2001).

The entropy decoder(s) (2080) entropy decode the quantized transform coefficients. When entropy decoding the quantized transform coefficients, the entropy decoder(s) (2080) can use arithmetic decoding, run-length Golomb-Rice decoding, or some other type of entropy decoding (e.g., Exponential-Golomb decoding, variable length decoding, dictionary decoding). Alternatively, the entropy decoder(s) (2080) apply some other form of adaptive or non-adaptive entropy decoding to the quantized transform coefficients. The entropy decoder(s) (2080) can also decode general control data, QP values, and other side information (e.g., mode decisions, parameter choices). The entropy decoder(s) (2080) can use different decoding techniques for different kinds of information, and they can apply multiple techniques in combination. When the entropy decoder(s) (2080) use parameters to adapt entropy decoding (e.g., estimates of distribution of quantized transform coefficients for buckets), the entropy decoder(s) (2080) also decode the parameters before decoding the quantized transform coefficients.

The decoder (2001) includes a general decoding control (not shown), which receives general control data from the demultiplexer (2090) and/or entropy decoder(s) (2080). The general decoding control provides control signals (not shown) to other modules (such as the inverse quantizer (2055), inverse region-adaptive hierarchical transformer (2045), and entropy decoder(s) (2080)) to set and change decoding parameters during decoding.

The octtree decoder (2020) receives compressed geometry data from the demultiplexer (2090) or entropy decoder(s) (2080) and decompresses the geometry data (2012). The octtree decoder (2020) passes the geometry data (2012) to the output buffer (2010) and to the inverse region-adaptive hierarchical transformer (2045). For example, the octtree decoder (2020) applies lossless decompression to the compressed geometry data. Alternatively, the octtree decoder (2020) decompresses the geometry data (2012) in some other way (e.g., lossy decompression, in which case a lossy-reconstructed version of the geometry data (2012) is passed to the inverse region-adaptive hierarchical transformer (2045)).

The inverse quantizer (2055) receives quantized transform coefficients from the entropy decoders (2080) and inverse quantizes the transform coefficients. For example, the inverse quantizer (2055) inverts uniform scalar quantization previously applied to the transform coefficients. Alternatively, the inverse quantizer (2055) performs inverse quantization in some other way. Based on QPs that it receives, the inverse quantizer (2055) can change the quantization step size on a frame-by-frame basis. Alternatively, the inverse quantizer (2055) can change the quantization step size on a tile-by-tile basis, block-by-block basis, or other basis. The inverse quantizer (2055) passes the transform coefficients to the inverse region-adaptive hierarchical transformer (2045).

With the geometry data (2012) received from the octtree decoder (2020) and the transform coefficients received from the inverse quantizer (2045), the inverse region-adaptive hierarchical transformer (2045) applies an inverse RAHT to the transform coefficients to reconstruct attributes (2014) of occupied points. The inverse region-adaptive hierarchical transformer (2045) uses the received geometry data (2012) when deciding how to apply the inverse RAHT to reconstruct attributes (2014). For example, the inverse region-adaptive hierarchical transformer (2045) applies an inverse RAHT to reconstruct attributes (2014) of occupied points. Alternatively, the inverse region-adaptive hierarchical transformer (2045) applies an inverse RAHT that is region-adaptive (processing attributes for occupied points) and hierarchical (passing attributes from one level to another level for additional processing) in some other way. In FIG. 20*a*, the inverse region-adaptive hierarchical transformer (2045) passes the reconstructed attributes (2014) resulting from the inverse RAHT to the output buffer (2010).

With reference to the decoder (2002) of FIG. 20*b*, the octtree decoder (2020) operates as in the decoder (2001) of FIG. 20*a*. The inverse region-adaptive hierarchical transformer (2045), inverse quantizer (2055), and entropy decoder(s) (2080) of the decoder (2002) of FIG. 20*b* essentially operate as in the decoder (2001) of FIG. 20*a*, but may process residual values for any of the attributes of occupied points. Also, for the decoder (2002) of FIG. 20*b*, the entropy decoder(s) (2080) can decode motion data (2078). The decoder (2002) of FIG. 20*b* further includes an intra/inter switch (2039), a motion compensator (2070), and a reference frame buffer (2074). In addition to other control functions, a general decoding control provides control signals to the intra/inter switch (2039), motion compensator (2070), and reference frame buffer (2074)) to set and change decoding parameters during decoding.

The decoder (2002) of FIG. 20*b* determines whether a given point cloud frame needs to be stored for use as a reference frame for inter-frame decompression of subsequent frames. The reference frame buffer (2074) buffers one or more reconstructed previously decoded point cloud frames for use as reference frames. When multiple reference frames are used, the multiple reference frames can be from different temporal directions or the same temporal direction. As part of the general control data, the decoder (2002) can receive information that indicates how to update the reference frame buffer (2074), e.g., removing a reconstructed point cloud frame, adding a newly reconstructed point cloud frame.

As shown in FIG. 20*b*, the intra/inter switch (2039) selects whether a given block is decompressed using intra-frame decompression or inter-frame decompression. Intra/inter switch (2039) decisions for blocks of the current point cloud frame can be indicated in syntax elements (or other bitstream elements) of the bitstream, decoded by the decoder, and converted into appropriate control data. The current point cloud frame can be entirely or partially decoded using inter-frame decompression. The inverse region-adaptive hierarchical transformer (2045) can produce blocks of reconstructed residual values (if inter-frame decompression is used) or reconstructed attributes (if intra-frame decompression is used). When inter-frame decompression is used (inter path at switch (2039)), reconstructed residual values, if any, are combined with the prediction values (2076) to produce a reconstruction of the attributes of occupied points for the current point cloud frame. (If the encoder (2002) does not encode prediction residual values, for reasons explained above, then the decoder (2002) does not decode any prediction residual values. In this case, the prediction values (2076) can be directly used as the reconstructed attributes, bypassing the addition component. The path to the addition component, and the addition component, are shown as optional in FIG. 20*b*.) When intra-frame compression is used (intra path at switch (2039)), the decoder (2002) uses the reconstructed attributes produced by the inverse region-adaptive hierarchical transformer (2045). The reference frame buffer (2074) stores the reconstructed attributes for use in motion-compensated prediction of attributes of subsequent frames. The reconstructed attributes can be further filtered by an in-loop post-processing unit (1946) (e.g., one or more voxel-distortion-correction filters, such as any of the filters described in more detail below (for instance, those described in Section VI.D.5), can be applied). The filtering can be performed based on filter control data, which is provided by the entropy decoder(s) (2080) or demultiplexer (2090).

The motion compensator (2070) receives motion data (2078) from the entropy decoder(s) (2080) or demultiplexer (2090). The motion data (2078) can include MV data and reference frame selection data. The motion compensator (2070) applies MV(s) for a block to the reconstructed reference frame(s) from the reference frame buffer (2074). For the block, the motion compensator (2070) produces a motion-compensated prediction, which is a region of attributes in the reference frame(s) that are used to generate motion-compensated prediction values (2076) for the block.

The output buffer (2010) is memory configured to receive and store reconstructed point cloud data (2005). For the reconstructed point cloud data (2005), the decoder (2001, 2002) outputs geometry data (2012) and reconstructed attributes (2014) for occupied points to the output buffer (2010). The output buffer (2010) provides the reconstructed point cloud data (2005) to a sink, e.g., one or more rendering components that generate one or more views of the reconstructed point cloud data (2005). The output buffer (2010) can include multiple frame storage areas. An output sequencer (not shown) can identify when the next point cloud frame to be produced in output order is available in the output buffer (2010). When the next point cloud frame to be produced in output order is available in the output buffer (2010), it is read by the output sequencer and output to the sink. In general, the order in which point cloud frames are output from the output buffer (2010) may differ from the order in which the point cloud frames are decoded by the decoder (2001, 2002) (bitstream order).

Also, after the decoder (2001, 2002), the system can include a post-processor (not shown) that performs post-processing (e.g., filtering) of the current point cloud frame after decoding. For example, the post-processing can include applying any of the voxel-distortion-correction filters described below (e.g., the morphological and/or adaptive filters described below). The post-processing can include color space conversion from primary (e.g., luma) and secondary (e.g., chroma) components to another color space (e.g., RGB), resampling, and/or other filtering. Thus, the decoder (2001, 2002) can include a post-processing filter. Whereas "in-loop" filtering is performed on reconstructed attributes in a motion compensation loop, and hence affects attributes of reference frames, the post-processing filter is applied to reconstructed attributes outside of the motion compensation loop, before output for rendering.

Depending on implementation and the type of decompression desired, modules of the decoders (2001, 2002) can be added, omitted, split into multiple modules, combined with other modules, and/or replaced with like modules. In alternative embodiments, decoders with different modules and/or other configurations of modules perform one or more of the described techniques. Specific embodiments of decoders typically use a variation or supplemented version of one of the decoders (2001, 2002). The relationships shown between modules within the decoders (2001, 2002) indicate general flows of information in the respective decoders (2001, 2002); other relationships are not shown for the sake of simplicity. In general, a given module of the decoders (2001, 2002) can be implemented by software executable on a CPU, by software controlling special-purpose hardware (e.g., graphics hardware for video acceleration), or by special-purpose hardware (e.g., in an ASIC).

VI. Exemplary Compression Methods for Voxelized Point Clouds

Disclosed below are example methods that can be performed by an encoder to compress 3D video data, and voxelized point clouds in particular. Also disclosed are corresponding decompression methods that can be performed by a decoder to decompress the 3D video data.

A. Introduction and Overview

There are many choices for representing 3D data, and the most appropriate choice depends on the situation. For example, dense voxel arrays may be good for representing dense volumetric medical data, while polygonal meshes may be good for representing surfaces of 3D objects typically found in computer graphics. Point clouds are well-suited to sample real world objects for which the data are volumetrically sparse, especially if the topology is not necessarily a 2D manifold. An alternative to point clouds are sparse voxel arrays, or voxel clouds, which are arbitrary collections of voxels. Unlike points, voxels have a volumetric aspect, which can be highly useful in certain scenarios. Point clouds and sparse voxel arrays obviate some of the common problems that 2D manifolds have, such as dealing with boundary conditions on cut edges, and topological changes over time. Yet another possible representation of 3D data is simply a set of color and depth maps, sometimes called multiview video plus depth (MVD). Such a set is a low-level representation close to the RGBD sensors. Closely related to color and depth maps are elevation maps and multi-level surface maps.

Figure 1:
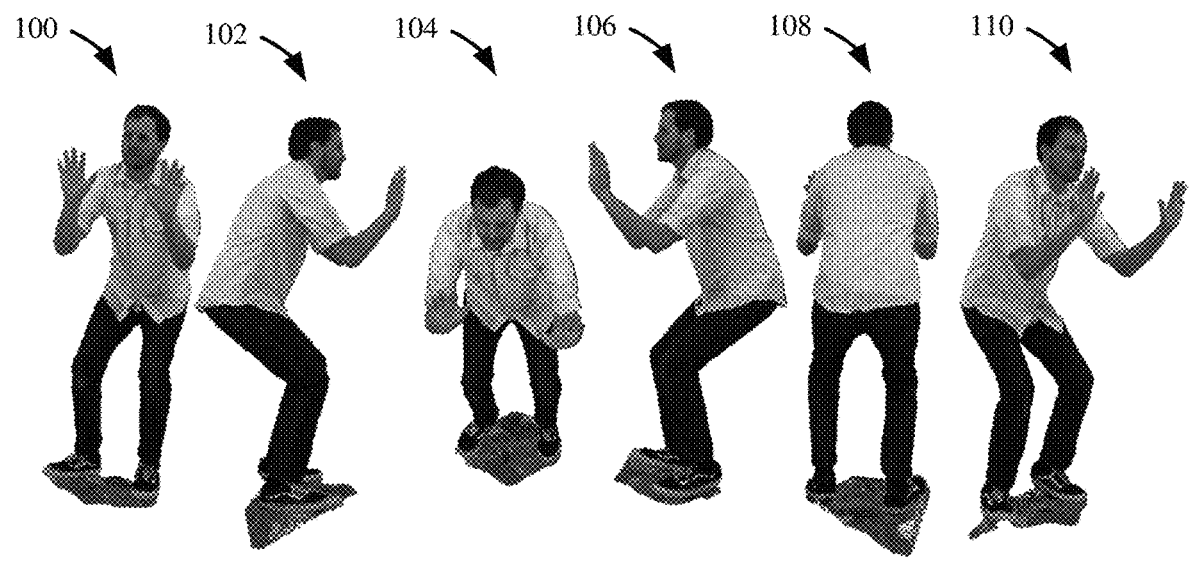
FIG. 1 shows six example viewpoints of a voxelized point cloud for an imaged subject.

Embodiments of the disclosed technology concern sparse voxel arrays, which are also referred to as "voxelized point clouds" in this disclosure. Such usage should not be construed as limiting, however, as the principles of the disclosed technology can be adapted for other types of 3D representations. Neglecting the volumetric aspect of voxels, voxelized point clouds can be considered simply as point clouds whose points are restricted to lie on a regular 3D grid or lattice. For example, FIG. 1 shows six example viewpoints (100, 102, 104, 106, 108, 110) of a voxelized point cloud for an imaged subject. In particular, as mentioned above, for the kinds of data expected in 3D scene capture, voxelized point clouds are a more natural fit than dense voxels arrays, and they obviate the kinds of problems that polygonal meshes have with sampled data. Compared to color and depth maps, voxelized point clouds are a higher level representation, in that redundancies and inconsistencies between overlapping sensor maps have already been removed in a multi-camera sensor fusion step. Compared to arbitrary point clouds, voxelized point clouds have implementation advantages and are highly efficient for real-time processing of captured 3D data.

Each type of representation typically employs its own compression technique. For voxelized point cloud representations, some compression schemes are based on an orthogonal graph transform and arithmetic coding of carefully modeled coefficients. The graph transform would appear to be a natural choice for the spatial transform of the color signal due to the irregular domain of definition of the signal. Unfortunately, the graph transform requires repeated eigendecompositions of many and/or large graph Laplacians, rendering the approach infeasible for real-time processing.

To overcome these drawbacks, an encoder using a region-adaptive hierarchical transform (RAHT) approach can be used to perform intra-frame compression. Such an approach, hereinafter referred to as the "RAHT" approach, can be used with embodiments of the disclosed technology and are described in more detail in U.S. patent application Ser. No. 15/168,016, filed on May 28, 2016, and entitled "REGION-ADAPTIVE HIERARCHICAL TRANSFORM AND ENTROPY CODING FOR POINT CLOUD COMPRESSION, AND CORRESPONDING DECOMPRESSION"; U.S. patent application Ser. No. 15/168,017, filed on May 28, 2016, and entitled "SCALABLE POINT CLOUD COMPRESSION WITH TRANSFORM, AND CORRESPONDING DECOMPRESSION"; and in R. L. de Queiroz and P. A. Chou, "Compression of 3D Point Clouds Using a Region-Adaptive Hierarchical Transform," *IEEE Transactions on Image Processing* (2016). The RAHT approach is specially developed for point clouds and, as noted, is used as a building block for certain example 3D video compression frameworks described herein. The disclosed technology is not limited to the use of RAHT, however, as other intra-frame compression schemes can also be used with any of the disclosed embodiments.

B. Voxelized Point Clouds

The embodiments disclosed below primarily concern voxelized point clouds, but can be adapted for use with other types of 3D data. In the specific embodiments disclosed below, 3D data is represented by voxelized point clouds. A point cloud is a set of points $\{v\}$, each point v having a spatial position (x,y,z) and a vector of attributes, such as colors, normals, or curvature. In this disclosure, it is assumed that the attributes are colors represented as (Y,U,V) tuples in YUV color space. A point cloud may be voxelized by quantizing the point positions to a regular lattice (e.g., with the point position corresponding to a predetermined location within or on the surface or corner of the volume represented by the voxel). A quantization cell, or voxel, is said to be occupied if it contains a point in the point cloud and is unoccupied otherwise. (A polygonal mesh may be likewise voxelized, in which case a voxel is occupied if and only if it contains a point of the surface.) An occupied voxel derives its color from the color(s) of the point(s) within the voxel, possibly by averaging or other technique. Here, it is assumed that each occupied voxel has a color.

Without loss of generality, it can be assumed that the voxels are addressed by positions in the integer lattice $\mathbb{Z}_W^3$, where $\mathbb{Z}_W = \{0, \ldots, W-1\}$, $W=2^D$ is its width, and D is an integer. Thus, x,y,z can be considered as D-bit unsigned integers. These are analogous to row and column indices in ordinary 2D image processing. Similarly, Y, U, and V can be considered to be 8-bit unsigned integers. Thus, for purposes of this disclosure, a voxelized point cloud is a finite set or arbitrarily indexed list of occupied voxels $\{v_i\}$ in which each voxel:

$$v_i = [x_i, y_i, z_i, Y_i, U_i, V_i] \qquad (1)$$

comprises a unique integer spatial location $(x_i, y_i, z_i)$ and an integer color vector $(Y_i, U^i, V_i)$.

Embodiments of the disclosed technology are specially adapted for live video and dynamic point clouds. Thus, at every discrete time t, a frame $F(t) = \{v_{it}\}$ can be defined as a list of voxels:

$$v_{it} = [x_{it}, y_{it}, z_{it}, Y_{it}, U_{it}, V_{it}]. \qquad (2)$$

Note that different frames may be represented by different lists of voxels, so there is no real relation between $v_{i,t}$ and $v_{i,t+1}$, since the indexing of the voxels in the lists is arbitrary. Moreover, different frames may have different numbers of occupied voxels It can be assumed that each voxel $v_{i,t+1} \in F(t+1)$ can be assigned to a corresponding voxel $v_{jt} \in F(t)$. Intuitively, one expects voxels to be shifted locally from one frame to another, due to more or less rigid translational motion, as illustrated in FIG. 2(a) and FIG. 2(b). However, since the shifts are not exactly rigid, in general this is a many-to-one mapping from F(t+1) to F(t). This mapping may be described by a $\|F(t+1)\| \times \|F(t)\|$ matrix $S(t) = \{s_{ijt}\}$ where $s_{ijt} = 1$ if the i-th voxel at frame t+1 corresponds to the j-th voxel in frame t, and is 0 otherwise. (Here, $\|F(t)\|$ is the number of occupied voxels in F(t).) If all the row vectors are stacked with the geometry information $G(t) = \{[x_{jt}, y_{jt}, z_{jt}]\}$ and the same is done with the colors $C(t) = \{[Y_{jt}, U_{jt}, V_{jt}]\}$, the geometry and color correspondence residues may be written:

$$E_g = G(t+1) - S(t)G(t), \qquad (3)$$

$$E_c = C(t+1) - S(t)C(t). \qquad (4)$$

Note that the geometry residues may be considered motion vectors, while the color residues may be considered color prediction errors.

One way to find an appropriate correspondence S(t) is to minimize (or otherwise reduce) a distortion measure based on these residues, for example by minimizing (or reducing):

$$\delta = \alpha_g \|E_g\|^2 + \alpha_c \|E_c\|^2, \qquad (5)$$

where $\alpha_g$ and $\alpha_c$ are multipliers indicating the relative importance of the magnitudes of the color and geometry residues.

Minimizing (or otherwise reducing) both geometry and color residuals is useful in embodiments of the disclosed compression schemes. However, such schemes are not immune from possible error.

Figure 2:
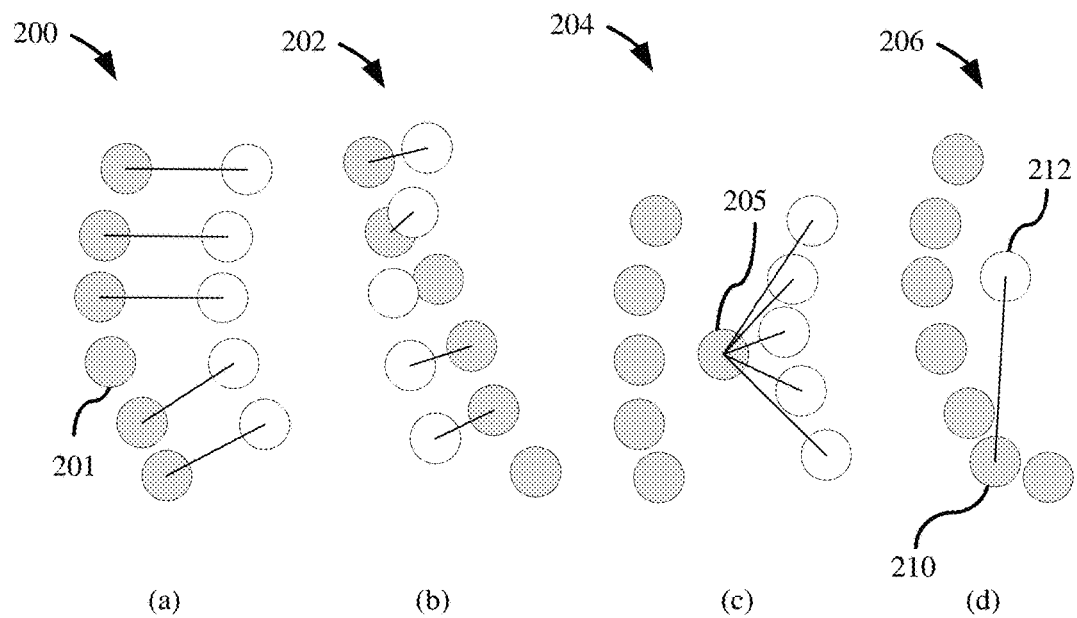
FIG. 2 and its subdiagrams are schematic block diagrams illustrating how correspondences can be determined between voxels between two consecutive frames and potential problems therewith.

In this regard, FIG. 2 and its subdiagrams are schematic block diagrams (200, 202, 204, 206) illustrating how correspondences can be determined between voxels between two consecutive frames. The diagrams (200, 202, 204, 206) also illustrate particular problems that may arise when determining correspondences. In the diagrams (200, 202, 204, 206), the grey circles illustrate example points (or voxels) in F(t), while the white circles represent points or voxels in F(t+1) (the next consecutive frame).

As illustrated in FIG. 2(a) (diagram 200), even for a simple linear motion, a Euclidean-distance criterion may lead to a non-uniform correspondence field, where voxel (201) is found to not have a corresponding voxel in the frame F(t+1).

FIG. 2(b) (diagram 202) illustrates voxels in consecutive frames that are misaligned, which can happen often in real-world scenarios.

FIG. 2(c) (diagram 204) shows how a stray voxel, for example created by noise, can act as a "lightning rod" attracting all local correspondence when the "true" correspondences are from the leftward-most set of voxels in FIG. 2(c). In more detail, if only geometry were considered, then the minimization (reduction) of Expression (5) would result in the assignment to each voxel $v_{i,t+1} \in F(t+1)$ the voxel $v_{jt} \in F(t)$ whose position is closest in Euclidean space, often resulting in poor correspondences, including "lightning rods," as illustrated by schematic block diagram (204) in FIG. 2(c), where closest voxel (205) is mistakenly assigned as corresponding to the five voxels in the next frame.

FIG. 2(d) (diagram 206) illustrates how correspondence based on color can lead to unpredictable fields, since associations can be made to any voxel far away as long as it has a similar color. (In diagram (206), the voxel (210) is determined to have the color closest to the color of the voxel (212) in the next consecutive frame, despite it being relatively distal to the voxel (212)). More specifically, if only color were considered, then the minimization (reduction) of Expression (5) would result in the assignment to each voxel $v_{i,t+1} \in F(t+1)$ the voxel $v_{jt} \in F(t)$ whose color is closest in color space. In effect, the voxels in F(t+1) would simply use the voxels in F(t) as colors in a palette, and the correspondences would be chaotic, as illustrated by schematic block diagram (206) in FIG. 2(d), where a voxel (210) that is relatively distance from the determined-corresponding voxel (212) is identified for correspondence purposes.

Smoothness of the corresponding field is another useful feature in determining correspondence (in addition to the magnitudes of the geometry and color residuals). Hence, a geometry residual smoothness term can be included as part of the correspondence determination. One example correspondence determination that combines a geometry residual smoothness term along with a color component and a geometry component is:

$$\delta = \alpha_c \|E_c\|^2 + \alpha_g \|E_g\|^2 + \alpha_s tr(E_g^T L(t+1) E_g), \qquad (6)$$

where L(t+1) is a Laplacian operator, whose quadratic form is the weighted sum of squared differences between the values at each voxel and its neighbors, and the trace operator simply sums up the separate contributions for x, y, and z components. There is evidence that humans perceive correspondence in terms of smoothed motion; hence the smoothness term is a good way to select correspondences that match human perception.

Recognizing that there is much existing work on determining correspondence fields for a 3D flow, this disclosure assumes that a suitable motion estimation approach is available and can be applied to the native 3D image data being compressed in order to produce motion estimates for the voxels between consecutive 3D images in a video sequence. Suitable motion estimation approaches that can be used with embodiments of the disclosed technology include, for example, those described in Y. Wang, J. Zhang, Z. Liu, Q. Wu, P. A. Chou, Z. Zhang, and Y. Jia, "Handling occlusion and large displacement through improved RGB-D scene flow estimation," *IEEE Trans. Circuits Syst. Video Techn.* (2015); S. Hadfield and R. Bowden, "Scene particles: Unregularized particle based scene flow estimation," *IEEE Trans. Pattern Analysis and Machine Intelligence*, vol. 36, no. 3, pp. 564-576 (2014); J.-M. Gottfried, J. Fehr, and C. S. Garbe, "Computing range flow from multi-modal Kinect data," in *Advances in Visual Computing*, pages 758-767

(Springer, 2011); E. Herbst, X. Ren, and D. Fox, "RGB-D flow: Dense 3-D motion estimation using color and depth," in *IEEE Int'l Conf. on Robotics and Automation (ICRA)* (2013); J. Quiroga, F. Devernay, and J. L. Crowley, "Local/global scene flow estimation," in *IEEE Int'l Conf. on Image Processing (ICIP)* (2013); X. Zhang, D. Chen, Z. Yuan, and N. Zheng, "Dense scene flow based on depth and multichannel bilateral filter," in Springer Computer Vision (ACCV), pp. 140-151 (2012); M. Hornacek, A. Fitzgibbon, and R. Carsten, "Sphereflow: 6 DoF scene flow from RGB-D pairs," in *IEEE Int'l Conf. on Computer Vision and Pattern Recognition (CVPR)* (2014); J. Quiroga, T. Brox, F. Devernay, and J. Crowley, "Dense semi-rigid scene flow estimation from RGBD images," in Springer Computer Vision (ECCV), pp. 567-582 (2014); Y. Niu, A. Dick, and M. Brooks, "Compass rose: A rotational robust signature for optical flow computation," *IEEE Trans. Circuits and Systems for Video Technology*, vol. 24, no. 1, pp. 63-73 (January 2014); and/or M. Dou, J. Taylor, H. Fuchs, A. W. Fitzgibbon, and S. Izadi, "3D Scanning Deformable Objects with a Single RGBD Sensor," in *IEEE Int'l Conf. on Computer Vision and Pattern Recognition (CVPR)* (2015).

Other motion estimation approaches can, of course, also applied in connection with the disclosed technology. Further, the particular embodiments disclosed below at times assume that the approach of M. Dou, J. Taylor, H. Fuchs, A. W. Fitzgibbon, and S. Izadi, "3D Scanning Deformable Objects with a Single RGBD Sensor," in *IEEE Int'l Conf. on Computer Vision and Pattern Recognition (CVPR)* (2015) ("Dou") is applied, though this usage is by way of example only. Specifically, in this disclosure, correspondence fields given by Dou are used as part of the efficient coding techniques described herein. Moreover, we use the correspondences to measure perceived geometric and color quantization error.

C. Distortion Metrics and Residuals

The focus of certain example embodiments disclosed herein is the encoding and transmitting of the voxelized point clouds of sequences of people and objects (e.g., the encoding of 3D-point-cloud blocks). For the purposes of visual reconstruction, the unoccupied and interior voxels do not need to be encoded, but only the external "shell" of the person or object. The sparsity of these occupied voxels allows efficient still frame or intra-frame compression of the geometry using octtrees. See, e.g., C. Loop, C. Zhang, and Z. Zhang, "Real-time high-resolution sparse voxelization with application to image-based modeling," in *High-Performance Graphics Conf.* pp. 73-79 (2013); and J. Kammerl, N. Blodow, R. B. Rusu, S. Gedikli, M. Beetz, and E. Steinbach, "Real-time compression of point cloud streams," in *IEEE Int. Conf. Robotics and Automation*, May 2012. Multiple frame or inter frame compression of the geometry can also be performed using octtrees. For example, the exclusive-OR (XOR) between sets of occupied voxels in successive frames can be used. See, e.g. D. Thanou, P. A. Chou, and P. Frossard, "Graph-based motion estimation and compensation for dynamic 3D point cloud compression," in *IEEE Int. Conf. Image Processing* (September 2015); J. Kammerl, N. Blodow, R. B. Rusu, S. Gedikli, M. Beetz, and E. Steinbach, "Real-time compression of point cloud streams," in *IEEE Int. Conf. Robotics and Automation* (May 2012). However, such methods will increase the data rate when the geometric distance between corresponding voxels are typically more than a unit voxel. Moreover, such methods code the geometry losslessly, and hence are not optimized from a rate-distortion point of view, nor can they achieve low bit rates. Accordingly, embodiments of the disclosed technology are designed to address these issues by selectively predicting the geometry as well as the color. Further, in some example implementations, the prediction residuals are encoded in a rate-distortion optimized way.

Specifically, from Expressions (3) and (4), the following can be obtained:

$$G(t+1)=S(t)G(t)+E_g \tag{7}$$

$$C(t+1)=S(t)C(t)+E_c, \tag{8}$$

from which one can obtain G(t+1) and C(t+1) by encoding the correspondences S(t) and the residuals $E_g$ and $E_c$.

In order to evaluate the distortion, although objective metrics such as peak signal-to-noise ratio (PSNR) have been very useful in evaluating image coders in most traditional video coding problems, geometry distortion is a complicating factor in the encoding of dynamic point clouds.

Generally speaking, embodiments of the disclosed technology use one or both of two approaches for computing distortion: an approach based on correspondence or an approach based on projection. Either approach or a combination of both (e.g., using a weighted sum) can be used.

In a correspondence-based distortion metric, and in certain example embodiments of the disclosed technology, correspondence is established between the original frame F(t) and the reconstructed frame $\hat{F}(t)$ using proximity. For instance, in one example implementation, a voxel in $\hat{F}(t)$ is associated to its spatially closest voxel in F(t). Once the association is made, the distortion is computed using a function of $E_g$ or $E_c$. From these pairing associations (e.g., all pairing associations for a given voxel), a further value can be computed, such as the mean-squared error (MSE) and, from it, the corresponding peak signal-to-noise ratio (PSNR).

Figure 3:
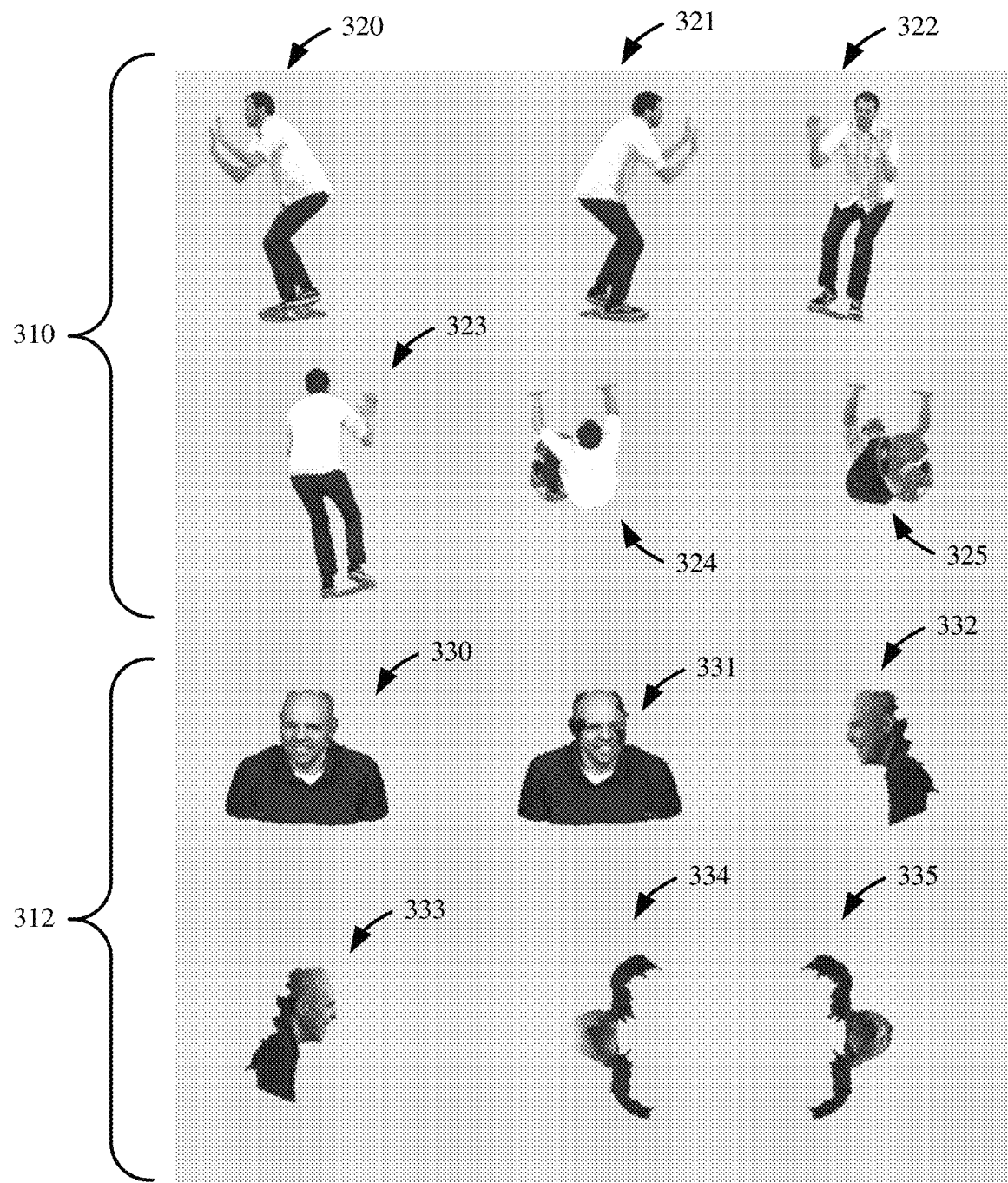
FIG. 3 shows projections from each of the six cube sides (e.g., right, left, front, back, top, bottom) for two 3D images.

For one particular example of computing distortion using proximity, let there be $N_V$ occupied voxels in the current frame and let $E_c$ compute only the residual of the Y color component. In particular, the MSE of this example implementation is:

$$\delta_{Y+G} = \frac{1}{N_V}(\|E_c\|^2 + \beta\|E_g\|^2) \tag{9}$$

where β weights the mixture of geometry and color distortions. From $\delta_{Y+G}$, PSNR-Y+G can be computed In a projection-based distortion measure, a projection view of the point cloud is rendered. In one particular example implementation, an orthogonal projection of the point cloud is generated over the six sides of a cube at the limits of the voxel space. The observer is assumed far away from the scene so that the rays from it to the voxels are parallel and the background is assumed at a mid-level of gray. An example frontal orthogonal projection within a 9-level test set is a 512×512-pixel image, the projections of which are shown in FIG. 3. In particular, FIG. 3 shows projections from each of the six cube sides (e.g., right, left, front, back, top, bottom) for two 3D images: a 3D image data set (310) labeled "man", and a 3D image data set (312) labeled "Ricardo".

For the "man" image data set (310), left projection (320), right projection (321), front projection (322), back projection (323), top projection (324), and bottom projection (325) are shown. For the "Ricardo" image data set (312), front projection (330), back projection (331), left projection (332), right projection (333), top projection (334), and bottom projection (335) are shown. Note that for the 3D image data set (312) for "Ricardo", the image data includes (roughly) only the frontal half of the imaged subject in shell form. As a consequence, some of the views do not comprise a volumetric solid shell as with image data set (310), but only a partial shell. For example, the back projection resembles the front projection when depicted in the 2D limitations of a flat page, as it comprises a view through the frontal shell of "Ricardo" from a rear vantage point.

In one example implementation, the distortion metric in between two point clouds, original and reconstructed, is then the MSE (or PSNR) in between the two corresponding composite images, each with the 6 orthogonal projections of the original or reconstructed Y frames. The corresponding PSNR can then be computed and is referred to herein as the "projection PSNR" or "PSNR-P".

D. The Motion-Compensated Coder

Embodiments of the disclosed technology comprise a coder for dynamic point clouds. Particular embodiments are specially adapted to perform real-time encoding (e.g., as may be used in "live" 3D video communication applications, including augmented-reality and virtual-reality implementations). Implementations of the coder are capable of outperforming the use of purely RAHT and octree approaches to compress color and geometry, respectively.

Embodiments of the disclosed technology use the temporal dimension to remove temporal redundancies. In other words, embodiments of the disclosed technology employ the observation that the geometry and color of a point cloud, in many instances, will not change much from one frame to another. In particular implementations, the coder uses F(t) as a predictor for F(t+1). Unlike other approaches, embodiments of the disclosed technology therefore use motion estimation and motion compensation as part of the compression scheme of dynamic point clouds. Embodiments of the disclosed technology have been observed to achieve higher compression ratios (even though, in some cases, lossy coding of the geometry may result).

1. Cube Motion Compensation

An example coder for 3D-point-cloud blocks is illustrated in schematic block diagram (400) of FIG. 4. The coder shown in FIG. 4 represents a targeted simplification of the coder described above with respect to FIGS. 19a-19b in order to highlight certain example operations of the disclosed coder. In FIG. 4, 3D-point-cloud-blocks of a current frame being encoded (shown as new voxel cubes (410)) are encoded using either intra-frame coding (represented by intra-frame coder (412)) or inter-frame coding using motion compensation as described below (represented by MV coder (414)). The encoding mode selection (shown as being made by mode selector (416)) is based on an evaluation of the rate-distortion performance of each mode. The selected mode can also be encoded as part of the encoded output. In the example shown in FIG. 4, the rate-distortion performance data is computed by RD mode decision module (418). To compute the rate-distortion performance of inter-frame encoding, motion compensator (420) provides the inter-frame-related data using motion vectors (422), which are provided by a motion estimator (not shown). If inter-frame compression is selected, the relevant motion vectors (422) can be encoded as part of the output. The coder shown in FIG. 4 also includes an in-loop decoding process emulator for reconstructing a frame for use as a reference frame for inter-frame compression of subsequent frames. This process includes a local decoder (430) (which can include an inverse quantization and inverse RAHT operation, as with (1955) and (1945) above) as well as an in-loop post-processor (432) (e.g., an in-loop post processor like processor (1946)) where one or more voxel-distortion-compensation filters as described below can be applied. The reconstructed frame is then stored in frame store (434) (e.g., reference frame buffer (1974)).

In many 2D video coders, the frame is broken into blocks of N×N pixels. In embodiments of the disclosed 3D video coder, the frame is broken into 3D blocks (cubes) of N×N×N voxels (the voxel space is partitioned into 3D blocks and the list of occupied voxels is likewise partitioned into occupied 3D blocks). Such 3D blocks are also referred to herein as 3D-point-cloud blocks. Further N can be any integer value of 2 or greater. So, the occupied 3D block (cube) at integer position $(b_x, b_y, b_z)$ is composed of occupied voxels within the block boundaries. Or, more formally, an occupied 3D block (cube) comprises occupied voxels $v_{it} = [x_{it}, y_{it}, z_{it}, U_{it}, V_{it}]$ such that $$b_x N \leq x_{it} < b_x N + N,$$

$$b_y N \leq y_{it} < b_y N + N,$$

$$b_z N \leq z_{it} < b_z N + N. \quad (10)$$

Note that each occupied 3D block may have between 1 and $N^3$ occupied voxels.

Figure 5:
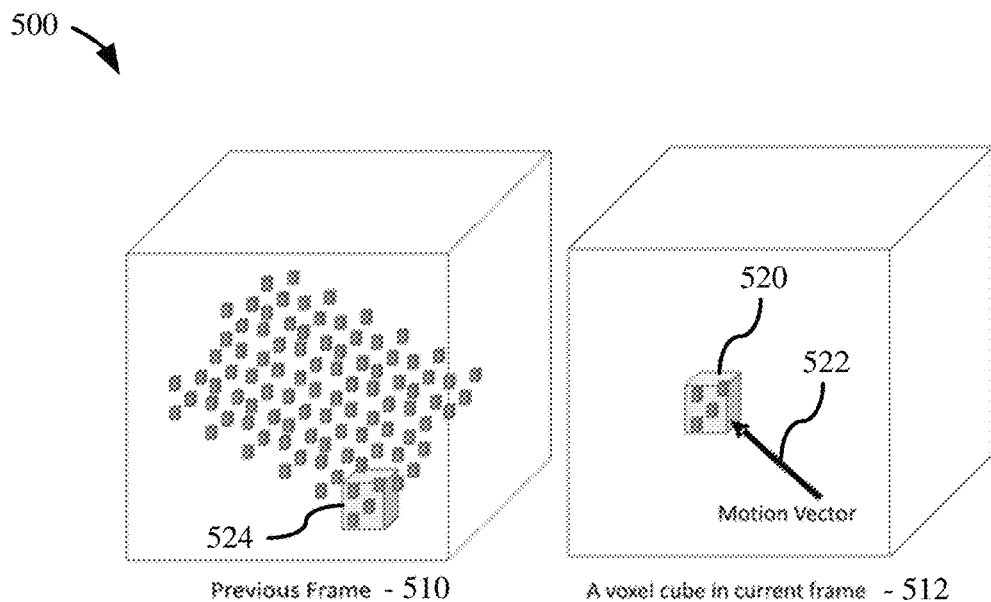
FIG. 5 is a schematic block diagram illustrating an example motion compensation scheme.

An example of a motion compensation process as can be used in embodiments of the disclosed technology is illustrated by the schematic block diagram (500) of FIG. 5. In FIG. 5, each occupied 3D block (cube) is associated with a motion vector (MV), whose components $(M_x, M_y, M_z)$ indicate a 3D block (cube) in a reference frame that will be used to predict a current 3D block (cube) being encoded. In FIG. 5, an occupied 3D block (520) (e.g., a cube comprising one or more occupied voxels) of a current frame (512) is associated with a motion vector (522) describing motion from an associated occupied 3D block (cube) (524) from the previous frame (510).

In accordance with one example motion compensation technique as can be used in embodiments of the disclosed technology, let $\Omega$ be the set of occupied voxels in a 3D block (block) at position $(b_x, b_y, b_z)$ in frame F(t). Then, $\Omega$ can be predicted from the set of voxels $[x_{i,t-1}, y_{i,t-1}, z_{i,t-1}, Y_{i,t-1}, U_{i,t-1}, V_{i,t-1}]$ originally in frame F(t−1) such that $$b_x N - M_x \leq x_{i,t-1} < b_x N + N - M_x,$$

$$b_y N - M_y \leq y_{i,t-1} < b_y N + N - M_y,$$

$$b_z N - M_z \leq z_{i,t-1} < b_z N + N - M_z. \quad (11)$$

This set is motion compensated by adding the motion vectors to its coordinates $(x_i \rightarrow x_i + M_x, y_i \rightarrow y_i + M_y,$ and $z_i \rightarrow z_i + M_z)$ to obtain the set $\Omega_p$ of voxels $[x_{i,t-1} + M_x, y_{i,t-1} + M_y, z_{i,t-1} + M_z, Y_{i,t-1}, U_{i,t-1}, V_{i,t-1}]$. The set $\Omega_p$ is used as a predictor of $\Omega$.

In order to compute a local distortion $\delta$ between $\Omega$ and $\Omega_p$, and in accordance with example embodiments of the disclosed technology, one or both correspondence- and projection-based metrics can be used.

For the correspondence-based distortion, as in Expression (5), the correspondences between occupied voxels in $\Omega$ and $\Omega_p$ can be computed using a process in accordance with the following example pseudocode:

TABLE 1

Pseudocode for Determining Example Correspondence-Based Distortion Metric

Let $\Omega$ have $N_\Omega$ voxels and let $\Omega_p$ have $N_{\Omega_p}$ voxels. If $N_{\Omega_p} \geq N_\Omega$, then
• Compute all $N_\Omega N_{\Omega_p}$ Euclidean distances across the sets;
• Set $\delta = 0$
• Find the smallest distance and associate those voxels
• Let their geometric distance be $\delta_g$ and let their color distance be $\delta_c$
• Update $\delta \to \delta + \delta_g + \beta\delta_c$
• Remove each voxel from its set (from both $\Omega$ and $\Omega_p$ )
• Repeat the process until all voxels in $\Omega$ are gone In the example pseudocode, $\beta=\alpha_c/\alpha_g$ is a constant used to linearly combine the distortions and maintain their relative importance. If $N_{\Omega_p}<N_\Omega$, one may duplicate voxels in $\Omega_p$ before computing $\delta$.

If, however, the distortion metric is based on projection, the voxels in $\Omega$ and $\Omega_p$ can be projected onto their six sides and the mean squared error of the Y channel of the individual projections can be computed.

It should be noted that the sum of the cube-to-cube distortions will not add up to the overall point cloud distortion under either of the two metrics because of the occlusions of the projections and of possible correspondences across cube boundaries. Nevertheless the example local distortion measures serve as strong approximations to the global ones.

As noted, embodiments of the disclosed technology can be used with a variety of motion estimation schemes. In particular example embodiments, the correspondences that are calculated from any suitable technique are used. For example, for the technique described in M. Dou, J. Taylor, H. Fuchs, A. W. Fitzgibbon, and S. Izadi, "3D Scanning Deformable Objects with a Single RGBD Sensor," in *IEEE Int'l Conf. on Computer Vision and Pattern Recognition* (*CVPR*) (2015), the correspondences that are calculated in the 3D surface reconstruction processes immediately prior to compression are used. In those processes, each voxel may have a correspondence to a voxel in the previous frame, but one MV per occupied block is used. From these correspondences, a voxel-oriented field of MVs can be produced. For instance, in one example embodiment of the disclosed technology, each voxel in $\Omega$ is associated with a MV. In order to find one MV for the whole set, and in one example implementation, the existing MV in $\Omega$ that is the closest to the average of all MVs in $\Omega$ can be used. This "median" MV can then be assigned to the 3D block (cube) containing $\Omega$.

2. Coding Mode Decision

Unlike traditional video coding, where the pixel position is known and its color is to be encoded, here, the need to encode the geometry along with the color makes it a distinct problem. In order to increase the compression rate so that the disclosed technology can be used in real-time compression scenarios, certain example embodiments omit one or more encoding steps that might otherwise be used to improve the quality of the predicted 3D image. For example, in certain embodiments, geometry residuals are not encoded. In other examples, however, geometry residuals are encoded and used by the decoder during reconstruction of the 3D image data.

Example coder embodiments in accordance with the disclosed technology operate in two modes: either (a) a 3D block (cube) comprising multiple voxels is purely motion compensated; or (b) it is entirely encoded in an intra-mode. In such embodiments, and as noted, encoding of geometry residuals is omitted.

In certain examples, the encoding mode decision is applied on a 3D-block-by-3D-block basis (as referred to as "a cube-by-cube basis" or "3D-point-cloud-block-by-3D-point-cloud-block basis") (e.g., for 3D blocks that include one or occupied voxels), but in other embodiments, the encoding mode decision is applied on a different basis (e.g., a frame-by-frame basis). In certain embodiments, the available encoding modes include an intra-frame encoding mode and an inter-frame encoding mode (e.g., where motion compensation is used). In such examples, frames can be designated as types I (intra-frame coded) or P (predicted), where one or more of the 3D blocks in the frame are inter-frame encoded. For an I-frame, all 3D blocks (cubes) are encoded using an intra-frame coding mode (e.g., using octtree encoding for the geometry and RAHT encoding for the color components). For a P-frame, example embodiments apply an inter-frame coding mode that uses a reference frame stored in the frame store, typically the previous frame but including one or more other previous frames, to predict motion for one or more 3D blocks (cubes) in the P-frame. For a P-frame, and in certain example embodiments, a mode decision for each occupied 3D block (cube) is made: whether it should be inter-frame coded (motion-compensated) or intra-frame coded. In certain embodiments, the decision is based on a test as to whether motion compensation alone produces a good enough approximation of the block. If so, $\Omega$ can be replaced by $\Omega_p$; if not, $\Omega$ can be coded independently using octtree and/or RAHT encoding.

In certain example implementations, the decision can be guided (e.g., optimized) in a rate-distortion (RD) manner. In general, the choice is about representing the 3D block (cube) by $\Omega$ (intra) or by $\Omega_p$ (inter). Each choice implies rates and distortions for both geometry and color components: $(R_g^{intra}, R_c^{intra}, D_g^{intra}, D_c^{intra})$ and $(R_g^{inter}, R_c^{inter}, D_g^{inter}, D_c^{inter})$. For example, in certain embodiments, one or more of the following components can be computed as a guide for determining the intra- vs. inter-coding decision:

$$R_{intra}=R_g^{intra}+R_c^{intra}\approx 2.5\|\Omega\|+R_c^{intra} \qquad (12)$$

$$R_{inter}=R_g^{inter}+R_c^{inter}=R_{MV} \qquad (13)$$

$$D_{intra}=D_g^{intra}+\beta D_c^{intra}=\beta D_c^{intra} \qquad (14)$$

$$D_{inter}=D_g^{inter}+\beta D_c^{inter}=\delta, \qquad (15)$$

where $R_{MV}$ is the average rate to encode one MV. In particular embodiments, Lagrangian costs can be computed for each mode, the mode with the smallest cost can be selected. For instance, the intra mode can be selected if and only if:

$$D_{intra}+\lambda R_{intra}<D_{inter}+\lambda R_{inter} \qquad (16)$$

and, otherwise, on inter mode can be used, for any fixed $\lambda>0$. These example metrics can be applied 3D-block-by-3D-block-basis (cube-by-cube) basis for point cloud data or, more generally, on a frame-by-frame basis (point-cloud-frame-by-point-cloud-frame basis).

Figure 6:
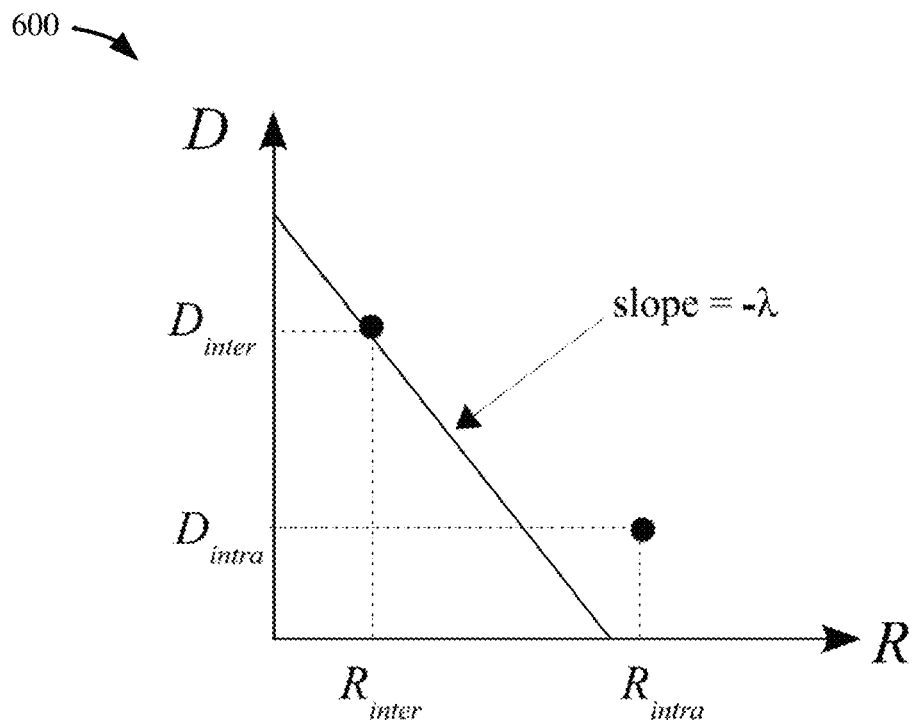
FIG. 6 is a graph showing the rate-distortion performance of different coding modes for a 3D block (cube)

The decision threshold for 3D block (cube) comprising multiple occupied voxels is illustrated in FIG. 6. In particular, FIG. 6 is a graph (600) showing the rate-distortion performance of different coding modes for a 3D block (cube): ($R_{inter}, D_{inter}$) for inter-mode and ($R_{intra}, D_{intra}$) for intra-mode. Minimizing the Lagrangian cost is equivalent to picking the point supported by the line of slope $-\lambda$. Note that a continuum of line slopes may support the same point.

Graphically, the points ($R_{inter}, D_{inter}$) and ($R_{inter}, D_{inter}$) are very distinct points in the distortion-rate plane, with (typically) $R_{inter}<R_{intra}$ and $D_{inter}>D_{intra}$. Let $$\lambda^* = \frac{D_{inter} - D_{intra}}{R_{intra} - R_{inter}} > 0 \quad (17)$$

be the magnitude of the slope of the line connecting the two points. Then, the intra mode criterion (16) reduces to:

$$\lambda < \lambda^*. \quad (18)$$

That is, a 3D block (cube) of voxels is encoded as intra if and only if its value of $\lambda^*$ is greater than the globally advertised value of $\lambda$, which is fixed across the sequence. One can see that the mode decision for a given block is not excessively sensitive to $\lambda$ since the choice is between only two RD points and many values of $\lambda$ may lead to the same mode decision for a given 3D block (cube).

Figure 7:
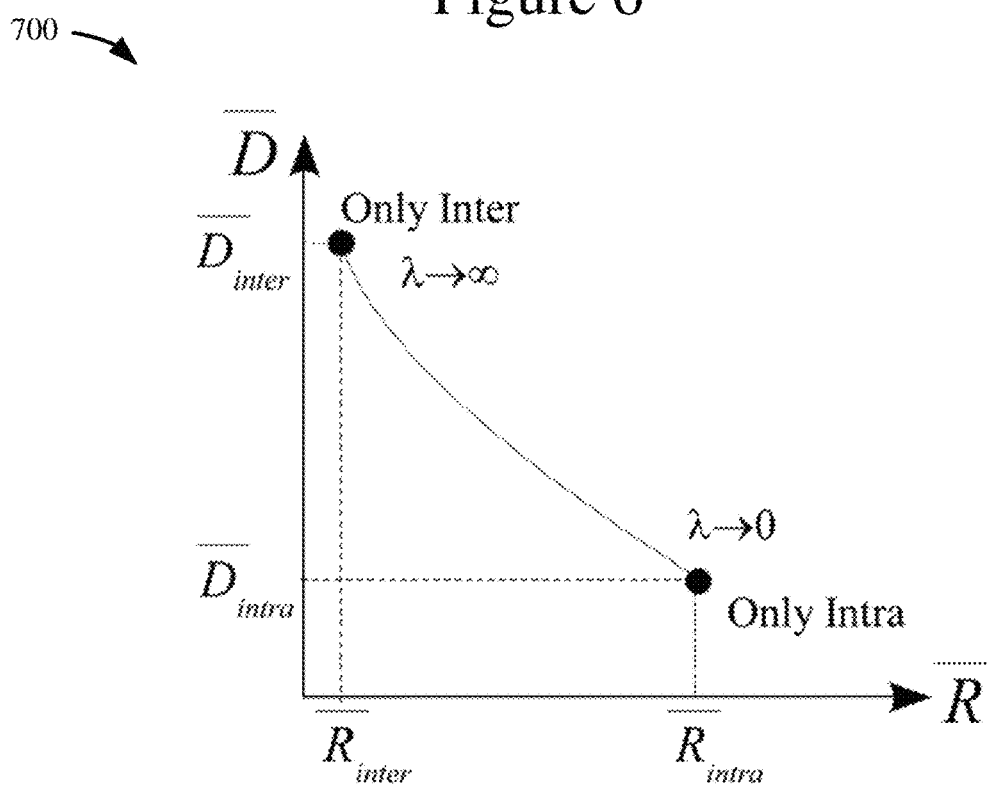
FIG. 7 is a graph showing the extremes of a P-frame for completely motion-compensating the whole frame with average RD performance ($\bar{R}_{inter}$, $\bar{D}_{inter}$) or encoding it as an I-frame with average RD performance ($\bar{R}_{intra}$, $\bar{D}_{intra}$).

For a P-frame, there are two extremes: intra-coding the whole frame or motion-compensating the whole frame. By varying $0 \leq \lambda < \infty$ from one extreme to the other, the frame can be encoded at these extremes or at various points in between. This is illustrated in FIG. 7. In particular, FIG. 7 is a graph (700) showing the extremes of a P-frame for completely motion-compensating the whole frame with average RD performance ($\bar{R}_{inter}, \bar{D}_{inter}$) or encoding it as an I-frame with average RD performance ($\bar{R}_{intra}, \bar{D}_{intra}$). By varying $\lambda$, the frame can be encoded at its extremes or at various points in between.

3. Rate or Distortion Control

For various embodiments disclosed herein, the rates and distortions of the color and motion vectors can be controlled by a quantizer step Q. Like $\lambda$, Q is also a means to trade-off rate and distortion. The overall 3D image coder essentially maps Q and $\lambda$ to an overall rate R and distortion D. In particular embodiments, the 3D image coder desirably operates on the lower convex hull (LCH) of all the RD points produced by spanning all Q and $\lambda$ combinations. Thus, for certain examples, it is desirable to find the $\lambda$ and Q points that are mapped into the LCH. In order to speed up the process, it is sometimes useful to derive a relation $\lambda = f_\lambda(Q)$ that would provide good results across many images. In other words, if the coder is a mapping from $(\lambda, Q)$ to $(R, D)$, then one can look for the curve defined by $f_\lambda$ in the $(\lambda, Q)$ plane that is to be mapped into the LCH in the RD plane. It is not always feasible to obtain such a function.

Figure 8:
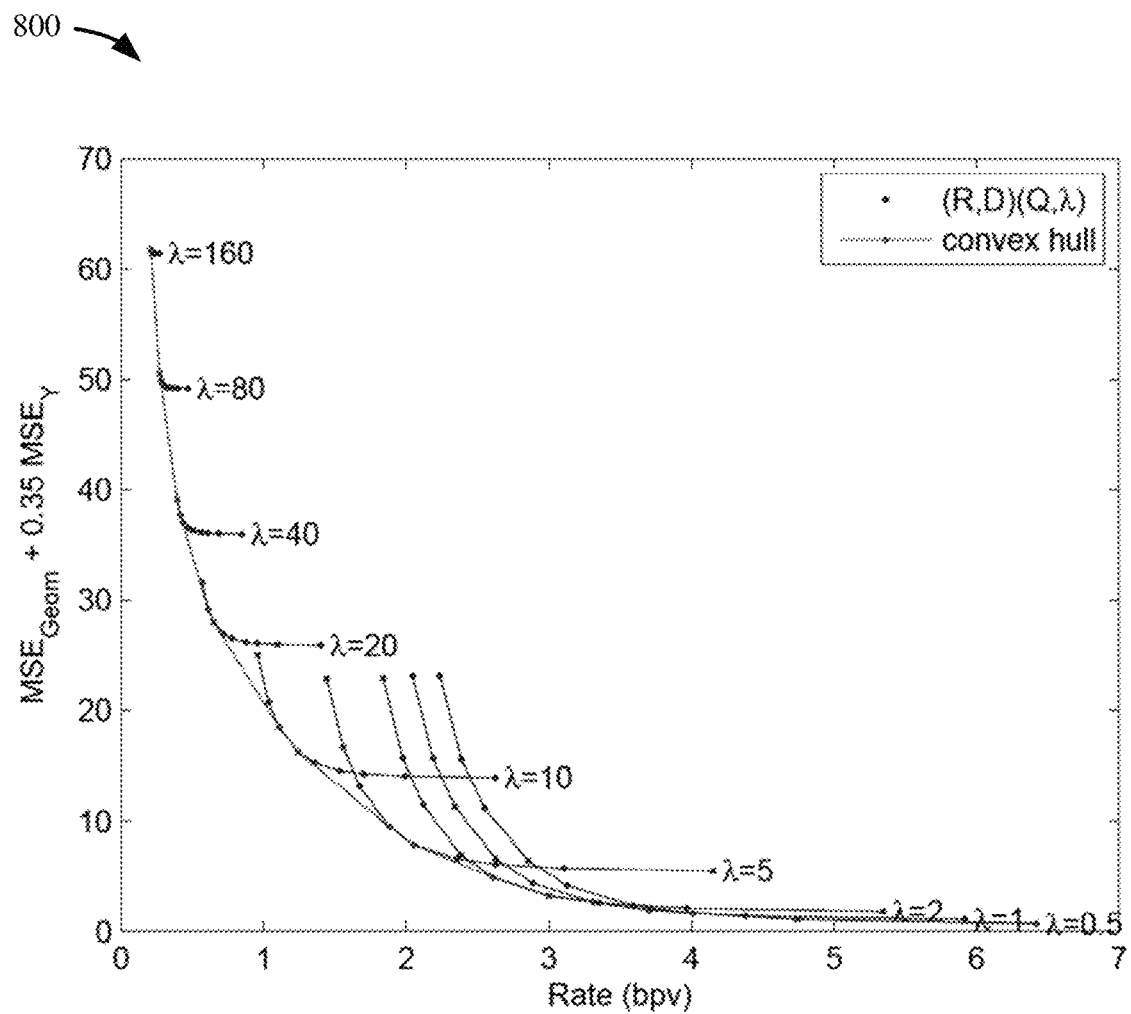
FIG. 8 is a graph showing RD plots for compressing the 56th frame of sequence "man" as a P-frame using the decompressed 55th frame as an I-frame reference.

In one example, shown in FIG. 8, the 56th frame of the sequence "man" is compressed as a P-frame using the decompressed 55th frame as a reference. The distortion metric is based on correspondence. Both $\lambda$ and Q are varied. In the figure one can see many RD curves, each for a fixed $\lambda$ and varying Q. In particular, FIG. 8 is a graph (800) showing RD plots for compressing the 56th frame of sequence "man" as a P-frame using the decompressed 55th frame as an I-frame reference. In this example, $\lambda$ was fixed and Q was varied for various values of $\lambda$ and Q. The convex hull of all points is also shown, which can model a curve relating $\lambda$ and Q.

The LCH of all those curves is also plotted in graph (800) of FIG. 8. The loci of all $(\lambda, Q)$ in the LCH curve is empirically approximated by $$\lambda = f_\lambda(Q) = Q^2/60, \quad (19)$$

which is one relation used in the example coder disclosed herein.

4. Encoded Data

In example embodiments of the disclosed technology, the compressed frame is locally reconstructed and then post-processed, in a process explained later, before being placed in a frame store where it will be available for motion compensation and prediction of the next frames (see, e.g., the coder diagram of FIG. 4).

The encoded data comprises one or more (e.g., all) of the following:
  Sequence parameters: GOP length, W, N, $\eta$, $\gamma$ (see next subsection);
  Number of occupied 3D blocks (cubes);
  List of occupied 3D blocks (cubes);
  Coding mode per occupied 3D block (cube);
  For intra-frame coded 3D blocks (cubes): occupied voxels encoded using octrees and color data encoded using RAHT and quantizer stepsize Q; and
  For inter-frame coded 3D blocks (cubes): motion vectors encoded using RAHT and quantizer stepsize $Q_{mv}$.

5. In-Loop Processing for Geometry Distortions

Unlike other coders for dynamic point clouds, certain embodiments of the disclosed technology apply lossy coding of the geometry. Even though a distance metric applied to two sets of point clouds may be useful as an objective measurement of the coding quality, small distortions to the geometry can cause blocking artifacts that are quite annoying.

In this regard, it should be noted that encoding artifacts (or other image errors) in 3D image data (e.g., point cloud data) are fundamentally different than blocking artifacts in the 2D image context, and thus are more aptly described as voxel-distortion errors. In the 3D image data context, a voxel-distortion error can result in a "gap" or "rip" in the surface of a point cloud representation of a volumetric object. Because point clouds typically represent just the surface, or shell, of such objects, the gap or rip produced by a voxel-motion-compensation error artifact may leave a void in the surface/shell, thus allowing luminance or chrominance values from background objects to penetrate "through" the point cloud, and thereby degenerating the coherence (and thus the "realness") of the point cloud representation. By contrast, blocking artifacts in 2D image compression simply result in visually apparent deviations that reveal the "blockiness" of the block-based compression techniques underlying the compression/decompression of an image—not a "gap" or "rip" in the shell of the imaged object itself.

In some example implementations of the disclosed technology, surfaces of dynamic point clouds are smoothed and gaps (rips) filled using voxel-distortion-correction filters specially adapted for 3D voxels. For instance, an in-loop smoothing filter and/or an in-loop morphological filter specially adapted for 3D voxels can be used.

In one example technique, the geometry elements are filtered to smooth the surface discontinuities caused by mismatch in the motion compensation process. Without loss of generality, for example, using the first dimension (x), the filter is:

$$\hat{x}_i = \frac{\sum_{j, d_{ij} < \eta} x_j \rho^{d_{ij}}}{\sum_{j, d_{ij} < \eta} \rho^{d_{ij}}}, \quad (20)$$

where $d_{ij} = \|v_i - v_j\|$ is the distance between voxels i and j, and $\eta$ controls the neighborhood size and the intensity of filtering. Such an operation may cause further holes in the geometry surfaces. Because of that, assuming the discontinuities will be more prominent at the cube boundaries, only voxels that are near the boundaries of a motion-compensated cube are replaced. Furthermore, to avoid creating more holes, we do not allow the voxel position to move away from the border. In effect, if $x_i$ is at the border, $x_i$ is not changed but $y_i$ and $z_i$ are replaced by $\hat{y}_i$ and $\hat{z}_i$, respectively.

After filtering, and in one example implementation, gaps are closed using morphological operations on the voxel geometry. For instance, in one example process, a dilation process is performed followed by an erosion operation. In particular implementations, dilation is performed by replicating each existing occupied voxel to its 26 immediate volumetric neighbors (or to n layers of volumetric neighbors, where n is 2 or greater), if such a neighbor is not occupied yet. Further, in this example process, the erosion operation is defined by erasing a given voxel if any of its 26 neighbors in 3D is unoccupied. The dilation can be performed $\gamma$ times with the same number of erosion operations. The combined process is known as a morphological closing operation. Holes up to $2\gamma$ voxels wide may be patched by the process. Other morphological processes are also possible, with greater reach during the dilation and erosion operations (e.g., where the dilation and erosion processes reaches to n layers of volumetric neighbors, where n is 2 or greater).

In particular implementations, the dilution/erosion operations are only applied to inter-frame coded cubes. Processed cubes not only are made available to the decoder and to the display, but can also be placed in the frame store so that the coder can use the frames processed in-loop to perform motion compensation for future frames.

6. Simulation Results

Simulations were carried out to demonstrate the capabilities of an example embodiment of the disclosed system, referred to in the figures as the motion-compensated intra-frame coder ("MCIC"). Two datasets were used for testing, both with W=512,200 frames, and captured at a rate of 30 frames per second. One sequence ("man") represents a full body in 3D, while the other sequence ("Ricardo") is intended for video conferencing and thus just a frontal upper body is represented. A GOP length of 8 was used (thus interspersing 7 P-frames between every I-frame). Since P-frames are degraded versions of I-frames (lower rate and higher distortion) and assuming the compression ratio should be similar for every intra-frame coded part in every frame, the rate peaks at every I-frame. $Q_{mv}=1$ was used and Q was varied to obtain the RD curves. Values of Q in the range of 5 through 45 were used for the MCIC, while the purely intra coder used quantizer values ranging from 10 to 50.

As for the in-loop filtering, after many tests, $\gamma=2$ and $\eta=2$ were selected. Nevertheless, this choice of parameters is by way of example only and not limiting, as a variety of other parameter settings and filtering approaches could be used.

Figure 9:
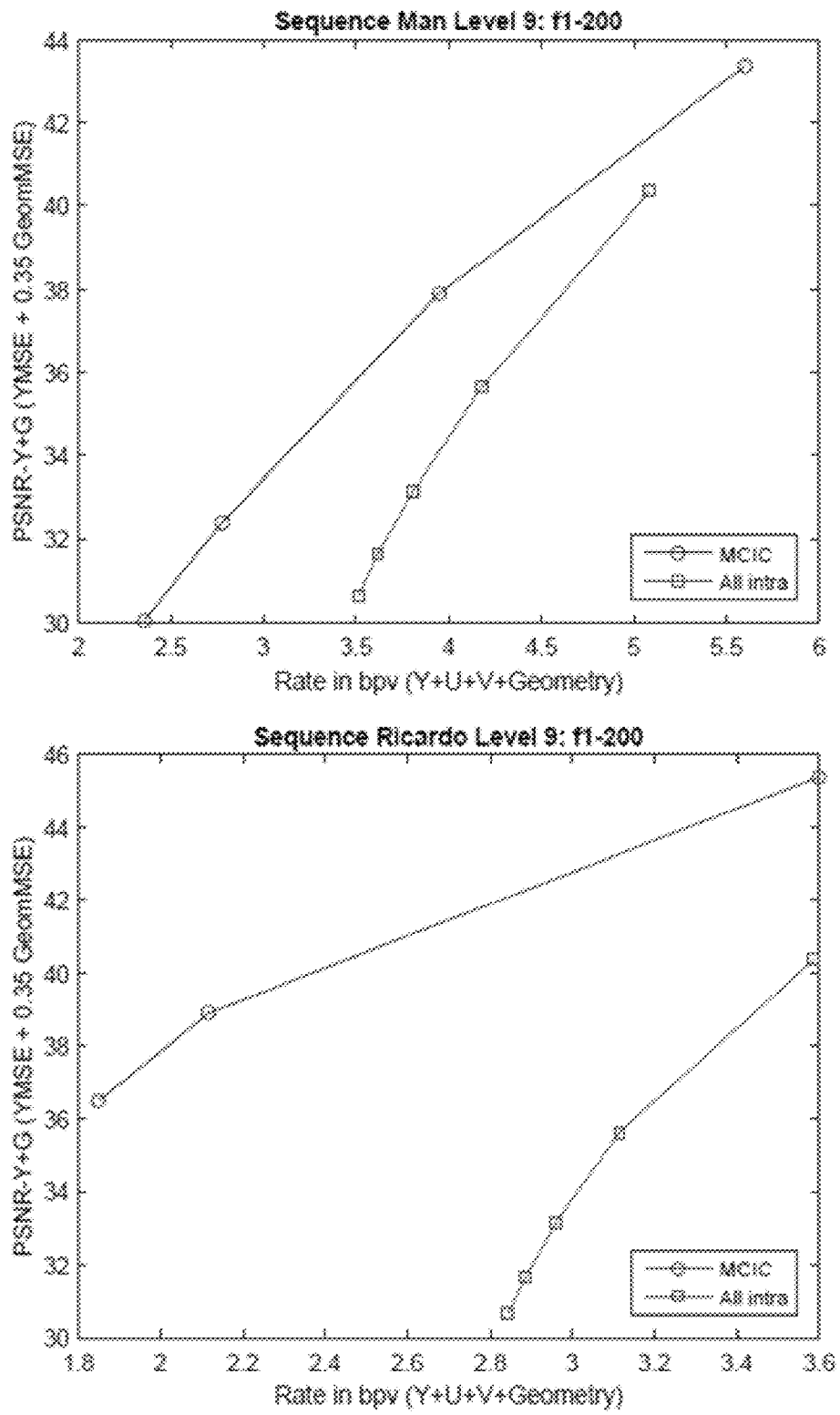
FIG. 9 shows RD plots for two example sequences using correspondence-based distortion metric.

For the correspondence-based distortion metric (PSNR-Y+G), a simple approximation to $f_\lambda(Q)$ yields very good results for both sequences tested. The function was derived from one single frame and yet it performs adequately for all other frames under this metric. Using $\lambda=f_\lambda(Q)=Q^2/60$, the RD plots for sequences "man" and "Ricardo" shown in graph 900 in FIG. 9 were obtained. In particular, FIG. 9 shows RD plots for sequence "man" and "Ricardo" using correspondence-based distortion: PSNR-Y+G. RD points were obtained by averaging rate or distortion for each frame over the entire sequence. The RD points are averages over all the 200 frames of the sequences. From the figure, one can easily infer the superior performance of the MCIC over purely intra coder under this metric.

Figure 10:
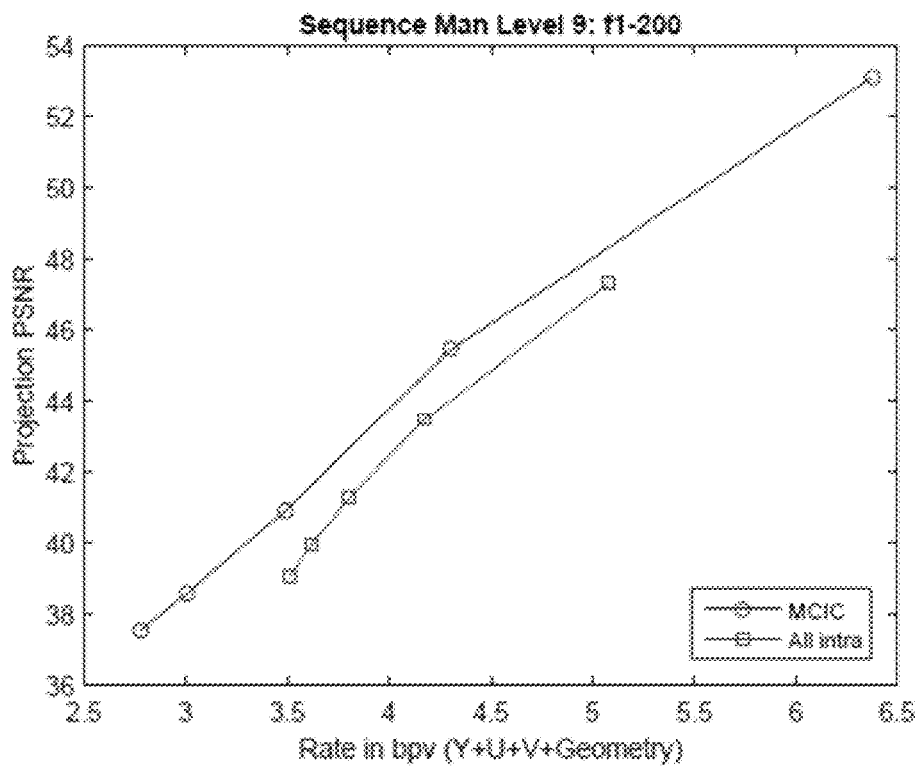
FIG. 10 shows RD plots for two example sequences using projection-based distortion metric.
Figure 10:
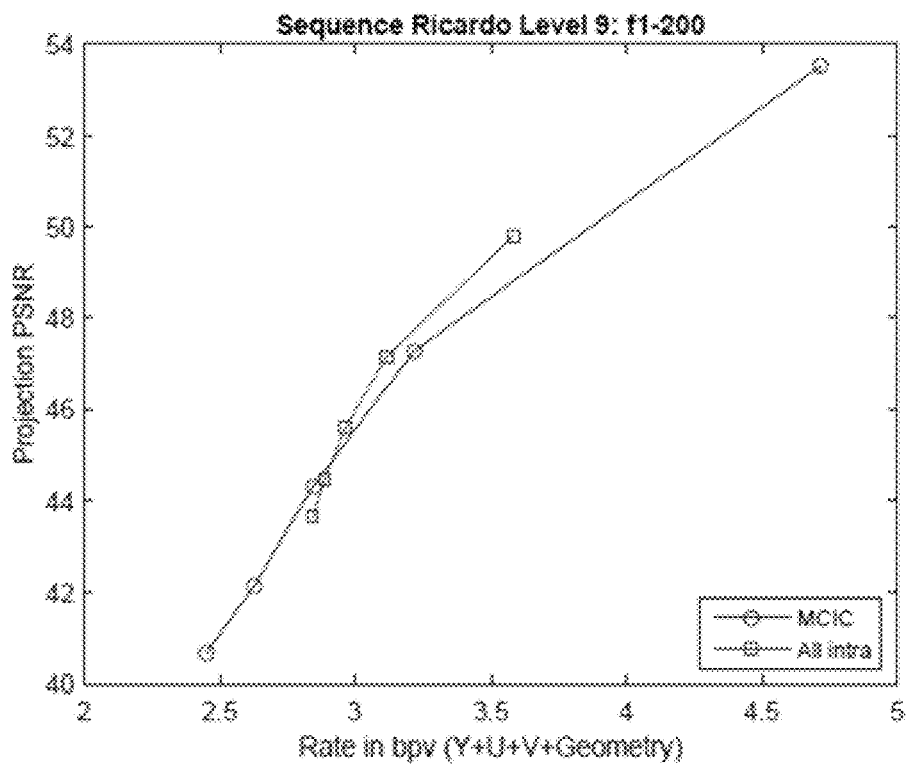

For the projection-based distortion metric (PSNR-P), a curve $f_\lambda$ was found that works well for sequence "man," and the RD curves are presented in graph (1000) of FIG. 10. In particular, FIG. 10 shows RD plots for sequence "man" and "Ricardo" using a projection-based distortion metric. RD points were averaged for each frame over the entire sequence. The RD points were obtained by averaging the rate or distortion of each frame in the entire sequence. The curve $f_\lambda$ was set from the results of a single frame with a simple least-squares fitting in the log domain, $f_\lambda(Q)=e^{a_3Q^3+a_2Q^2+a_1Q+a_0}$, for $a_0=-71873$, $a_1=0.35998$, $a_2=-7.6525\times 10^{-3}$, $a_3=5.6329\times 10^{-5}$. Despite the sub-optimality of fitting with least squares instead of a proper RD criterion, the solution yields good results for sequence "man," as depicted in graph 1000 of FIG. 10.

Figure 11:
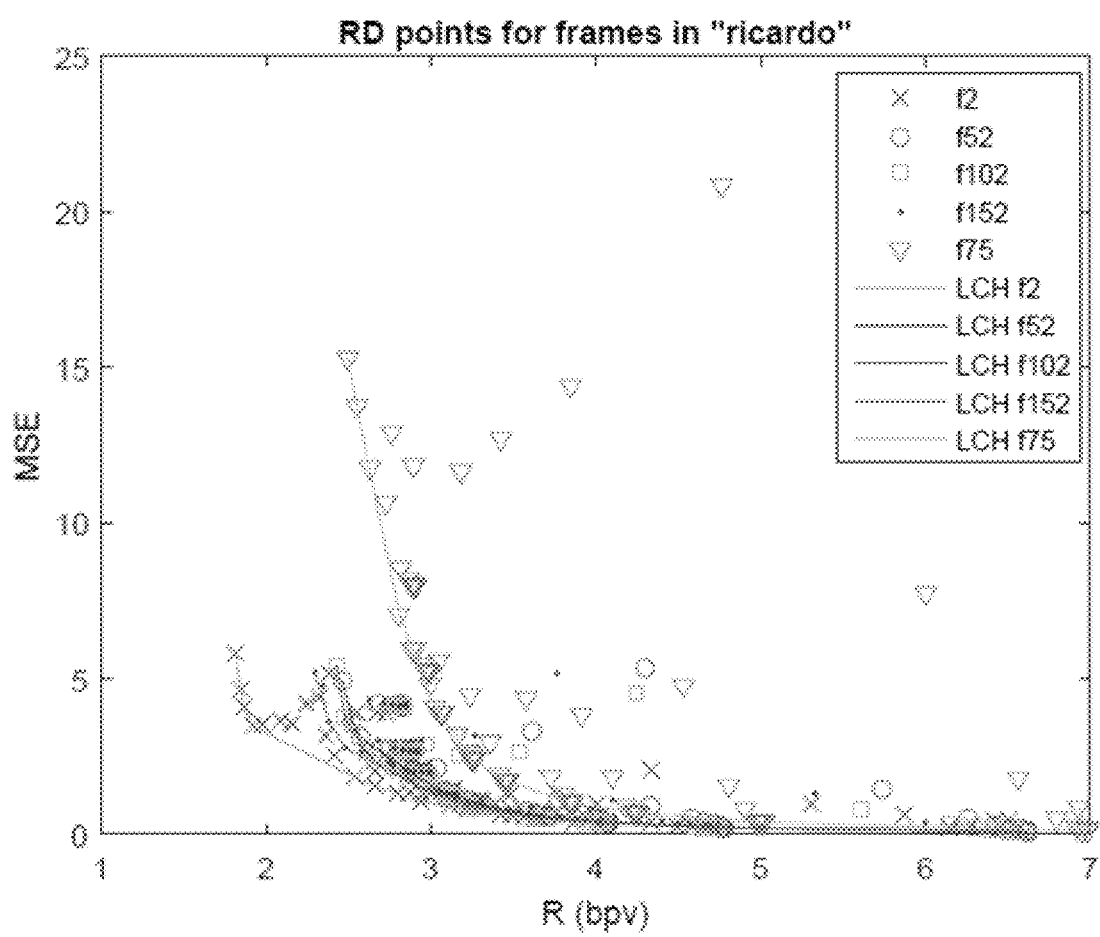
FIG. 11 shows the RD plots for different frames in an example sequence indicating their LCH under a projection-based distortion metric.

The results are not so simple for sequence "Ricardo" under PSNR-P. It is not easy to find a function $f_\lambda$ that works for most frames. Not only it is a rapidly changing sequence, but its noise level and the fact of being front-faced makes the estimation of the global distortion from local cube projections more difficult. The non-stationarity is illustrated in graph 1100 of FIG. 11, which shows the RD points and the corresponding LCH for different frames of the sequence. In particular, FIG. 11 shows the RD plots for different frames in sequence "Ricardo" indicating their LCH under a projection-based distortion metric. Note how widely the LCH curves vary among frames. It is possible, however, to improve significantly the RD performance of MCIC on this sequence by fixing $\lambda$ and choosing an optimal value of Q separately for each frame (e.g., using exhaustive search techniques).

Figure 12:
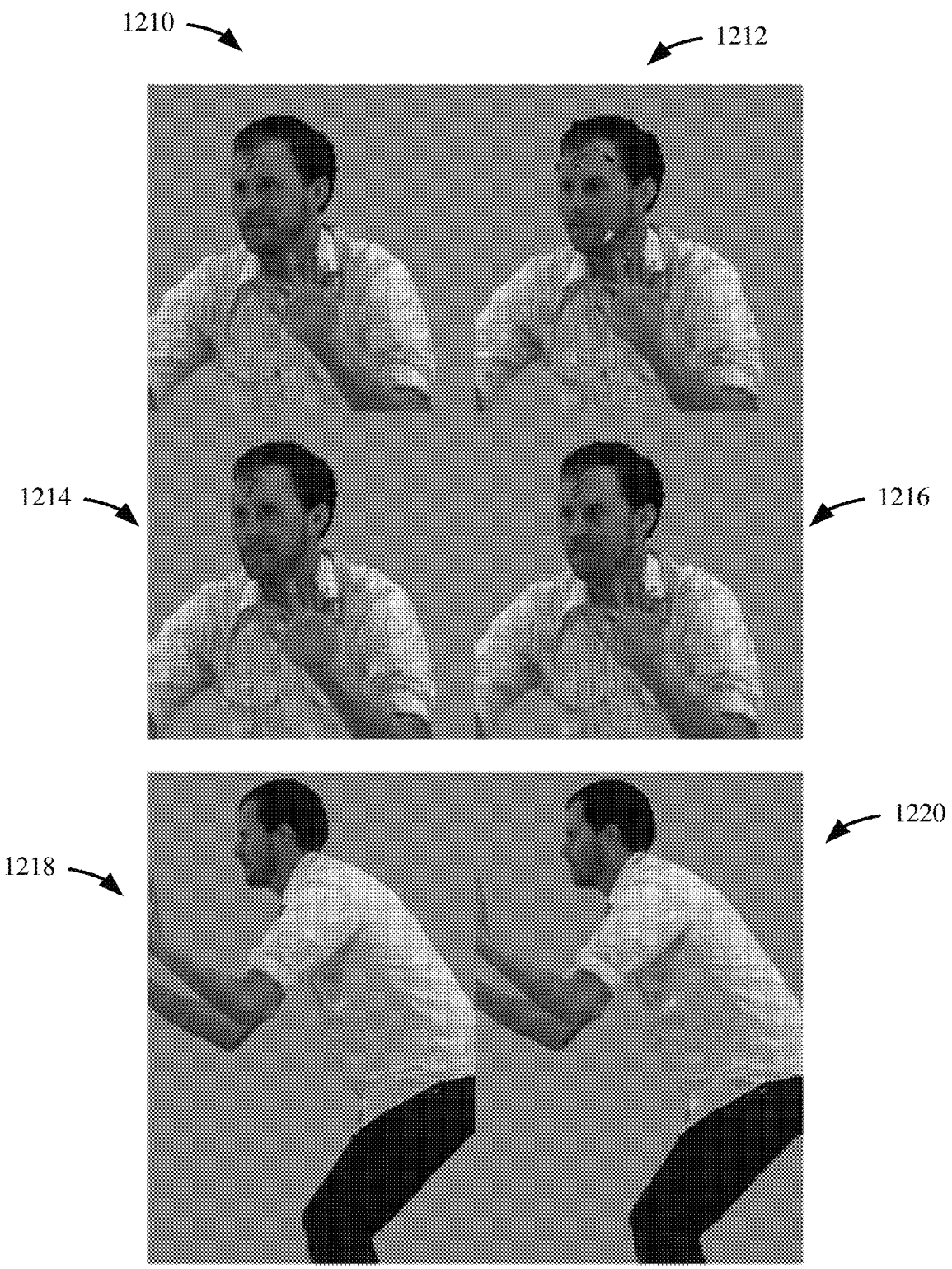
FIG. 12 show a front projection rendering comparing MCIC against intra-coder (RAHT) for a frame in an example sequence.

In general, the choice of distortion metric to use can be a subjective one. As an example, FIG. 12 shows a comparison between methods for frame 58 of sequence "man" It shows example zoomed views of the original frame and equivalent views of the frames compressed using MCIC under correspondence- and projection-based metrics, and the intra coder. In particular, the top four images (1210, 1212, 1214, 1216) of FIG. 12 show a front projection rendering comparing MCIC against intra-coder (RAHT) for frame 58 in sequence "man" In particular, the top left image (1210) is the original; the top right image (1212) shows MCIC under a correspondence-based distortion metric; the left image (1214) shows MCIC under a projection-based distortion metric; and the right image (1216) shows a result from RAHT. Rates are about 3.7 bpv for all three compression cases. For the bottom images, image (1218) shows a front projection rendering comparing the original frame with its MCIC reconstructed image (1220) after a compression to 4.4 bpv.

The rate is about 3.7 bpv for all cases. The correspondence-based result produces the best color, but with a few speckles of noise caused by geometry shifts. Those artifacts are caused by introducing holes in the object shell, which causes the view to show the background color, which usually contrasts against the foreground shell color. These holes (rips) were not corrected by the two post-processing operators, in this example, indicating that the post-processing steps of the example implementation could be further tuned to mitigate these artifacts.

Another comparison can be drawn from the bottom of FIG. 12, which shows a zoomed view of the original 75th frame of sequence "man" (1218), side-by-side with its decompressed version using MCIC (projection-based distortion for mode selection) (1220) at around 4.4 bpv.

Figure 13:
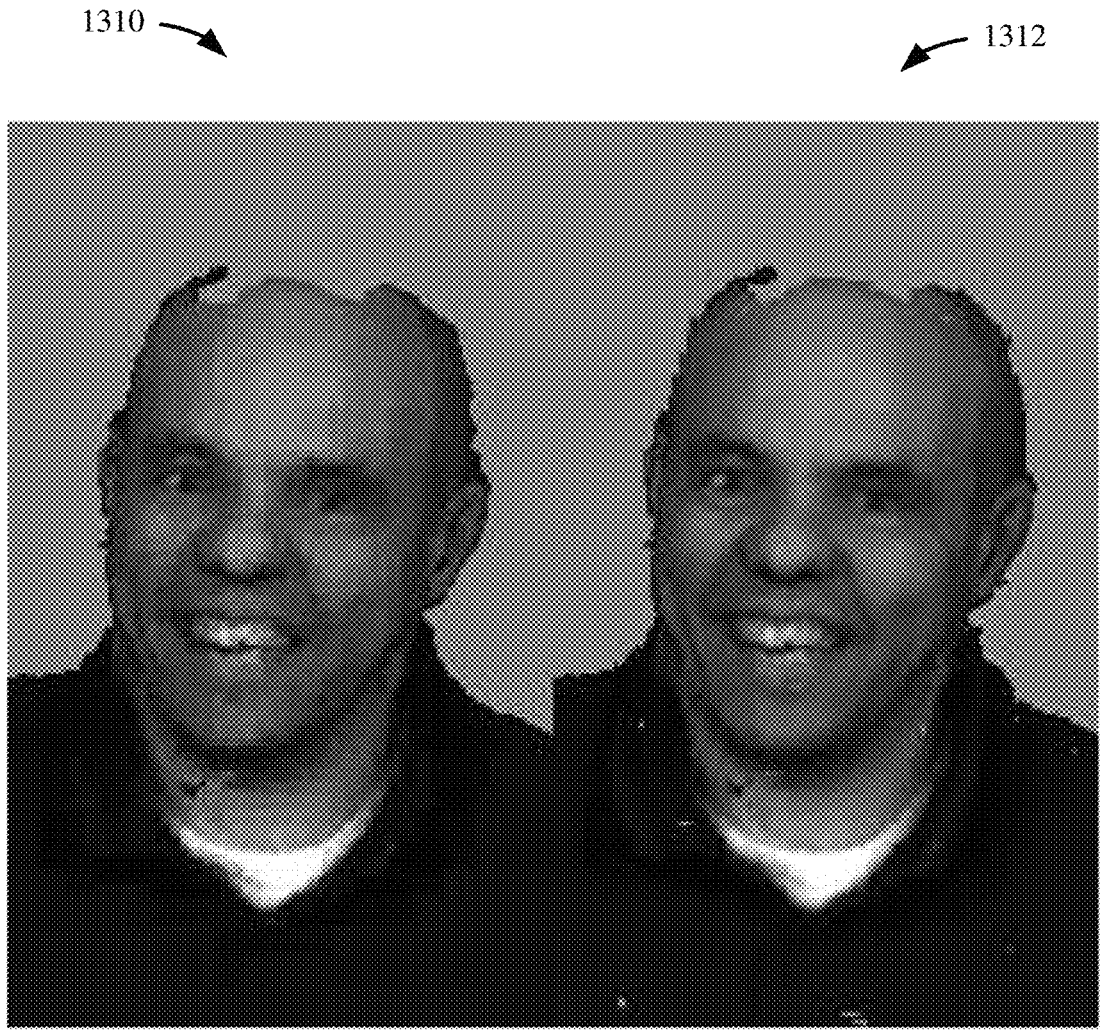
FIG. 13 shows a similar comparison as in FIG. 12 for a frame of an example sequence which was compressed using MCIC (correspondence-based distortion for mode selection) and intra coding.

FIG. 13 shows a similar comparison for a frame of sequence "Ricardo," which was compressed using MCIC (correspondence-based distortion for mode selection) (shown in image (1310)) and intra coding (shown in image (1312)), at a rate around 2.6 bpv.

E. General Embodiments

Disclosed herein are embodiments of a motion-compensation scheme for use with dynamic point clouds. The encoder works on dividing the cloud into 3D blocks of occupied voxels (also referred to as occupied "3D-point-cloud blocks") and deciding for each one if the block should be intra-frame coded or simply motion-compensated from the past frame. The replacement of intra-frame coded data for a slightly distorted (or not) set of voxels saves many bits, but potentially introduces errors not only to the voxel colors, but also to their positions (geometry). In effect, a P-frame may become a degraded I-frame whose extra distortion is found to be "worth it" in an RD sense. With that extra degradation, embodiments of the disclosed technology are able to extend the bit-rate range below where the intra coder can effectively operate and to exceed the performance of the intra coder at any rate under a given objective distortion measure.

Figure 14:
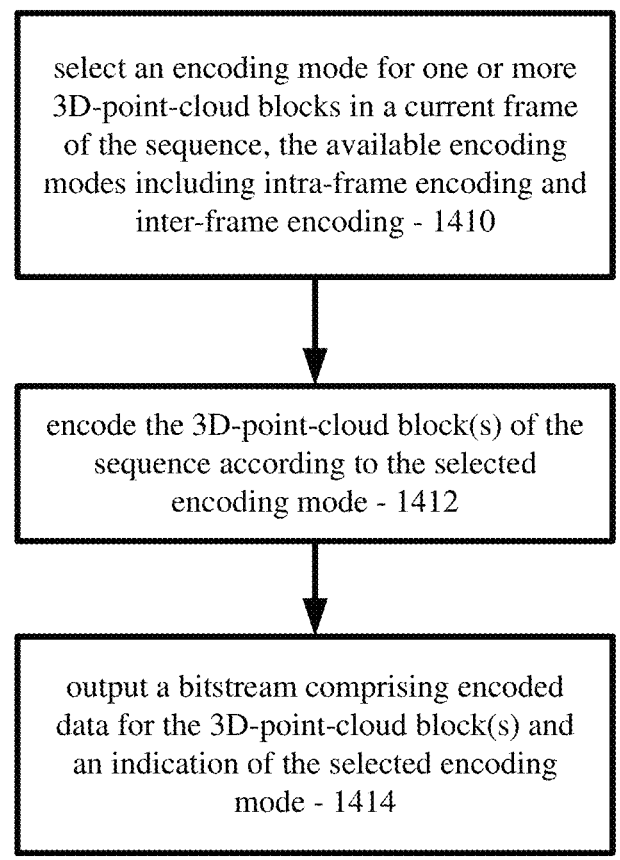
FIG. 14 is a flowchart illustrating an example process for encoding point cloud data for a sequence of frames using aspects of the disclosed technology.

FIG. 14 is a flowchart (1400) illustrating an example process for encoding point cloud data for a sequence of frames using aspects of the disclosed technology. In particular, the flowchart (1400) shows a process by which 3D-point-cloud blocks from a current frame being encoded (e.g., a frame comprising voxelized point cloud data) can be encoded according to embodiments of the disclosed technology. The disclosed embodiment can be performed by a computing device implementing a three-dimensional video encoder, which may be further configured to produce a bitstream. The encoder can be part of an encoder system, which can comprise, for example, a buffer configured to store voxelized point cloud data of a sequence of three-dimensional video frames. The particular embodiment illustrated should not be construed as limiting, as the disclosed method acts can be performed alone, in different orders, or at least partially simultaneously with one another. Further, any of the disclosed methods or method acts can be performed with any other methods or method acts disclosed herein.

At (1410), an encoding mode is selected for one or more occupied 3D-point-cloud blocks in a current frame of the sequence. In the illustrated embodiment, the encoding mode is one of a plurality of available encoding modes, the available encoding modes including intra-frame encoding and inter-frame encoding.

At (1412), the one or more occupied 3D-point-cloud blocks of the current frame of the sequence are encoded according to the selected encoding mode.

At (1414), a bitstream comprising encoded data for the one or more occupied 3D-point-cloud blocks is output. In accordance with embodiments of the disclosed technology, the bitstream can include a syntax element or bitstream element signaling the selected encoding mode for the one or more occupied 3D-point-cloud blocks (e.g., on a 3D-point-cloud-block-by-3D-point-cloud-block basis).

In particular implementations, the inter-frame encoding mode uses motion compensation. In such cases, the motion prediction used for the motion compensation can be block translational, affine, or non-rigid. Further, in some examples, the motion compensation uses block replenishment. For instance, the block replenishment can comprise matching an occupied 3D-point-cloud block from the current frame with a corresponding occupied 3D-point-cloud block from a previous frame using motion vector data; and encoding the motion vector data for the occupied 3D-point-cloud block. In some cases, the block replenishment excludes encoding of geometry residuals (thus increasing the encoding rate, which can be particularly useful in real-time applications such as video conferencing). In other embodiments, however, geometry residuals and/or color residuals are encoded. In embodiments of the disclosed technology, the selecting of the encoding mode is based at least in part on a correspondence-based metric, a projection-based metric, or a combination of both the correspondence-based metric and the projection-based metric. Further, in certain embodiments, the selecting of the encoding mode is based at least in part on a metric that includes both geometry and color components. In some embodiments, the selecting is based on a threshold that relates rate-distortion performance for intra-frame encoding to rate-distortion performance for inter-frame encoding.

Figure 15:
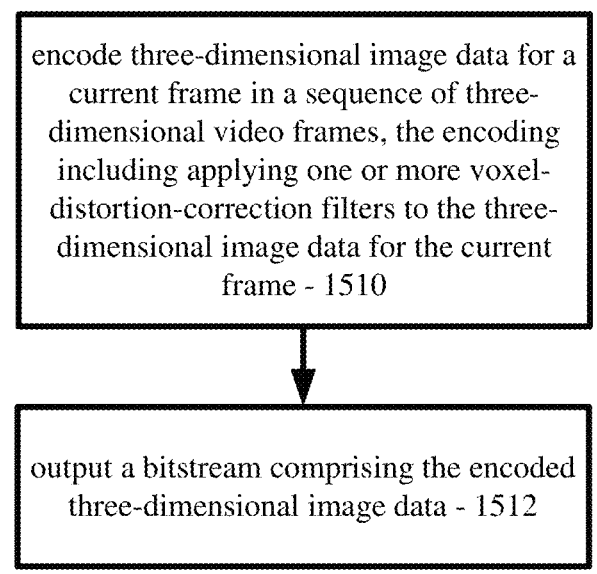
FIG. 15 is a flowchart illustrating another example process for encoding point cloud data for a sequence of frames using aspects of the disclosed technology.

FIG. 15 is a flowchart (1500) illustrating another example process for encoding point cloud data for a sequence of frames using aspects of the disclosed technology. In particular, the flowchart (1500) shows a process by which 3D-point-cloud blocks from a current frame being encoded (e.g., a frame comprising voxelized point cloud data) can be encoded according to embodiments of the disclosed technology. The disclosed embodiment can be performed by a computing device implementing a three-dimensional video encoder, which may be further configured to produce a bitstream. The encoder can be part of an encoder system, which can comprise, for example, a buffer configured to store voxelized point cloud data of a sequence of three-dimensional video frames. The particular embodiment illustrated should not be construed as limiting, as the disclosed method acts can be performed alone, in different orders, or at least partially simultaneously with one another. Further, any of the disclosed methods or method acts can be performed with any other methods or method acts disclosed herein.

At (1510), three-dimensional image data for a current frame in a sequence of three-dimensional video frames is encoded. In this example, the frame is formed from a plurality of 3D-point-cloud blocks, and the encoding includes encoding occupied ones of the 3D-point-cloud blocks. In some example embodiments, the encoding further comprises applying one or more voxel-distortion-correction filters to the three-dimensional image data for the current frame. In particular implementations, the voxel-distortion-correction filters are applied to one or more 3D-point-cloud blocks that are encoded using an inter-frame encoding technique (e.g., only to inter-frame encoded 3D-point-cloud blocks and not to intra-frame encoded 3D-point-cloud blocks).

At (1512), a bitstream comprising the encoded three-dimensional image data is output.

In particular implementations, each 3D-point-cloud block includes a plurality of voxels. Further, in some examples, the voxel-distortion-correction filters are applied in-loop during inter-frame encoding (see, e.g., FIG. 4). The voxel-distortion-correction filters applied at (1510) can comprise a morphological process, a smoothing process, or both. For example, a suitable morphological process comprises a dilation phase, and an erosion phase. During the dilation phase, for instance, one or more existing occupied voxels can be replicated volumetrically to volumetric neighbors. Further, the voxel-distortion-correction filter can include an adaptive filtering process (see, e.g., Expression (20)).

During decoding, the reverse operations are performed. For example, during decoding, encoded three-dimensional image data for a current frame in a sequence of three-dimensional video frames is decoded. In this example, the frame is formed from a plurality of 3D-point-cloud blocks, and the decoding includes decoding occupied ones of the 3D-point-cloud blocks. In some example embodiments, the decoding further comprises applying one or more voxel-distortion-correction filters to the three-dimensional image data for the current frame. The filters can be any of the filters disclosed herein. In particular implementations, the voxel-distortion-correction filters are applied to one or more 3D-point-cloud blocks using an inter-frame decoding technique (e.g., the filters are applied only to inter-frame encoded 3D-point-cloud blocks and not to intra-frame encoded 3D-point-cloud blocks). Further, the voxel-distortion-correction filters can be applied in-loop or out-of-loop (e.g., as an out-of-loop post-processing step after reconstruction of the point-cloud frame). Finally, the decoded three-dimensional image data is output (e.g., as voxelized point cloud data that can be rendered on a suitable display device (such as a headset, near-eye display, stereoscopic monitor, flat-screen monitor, or the like).

Figure 16:
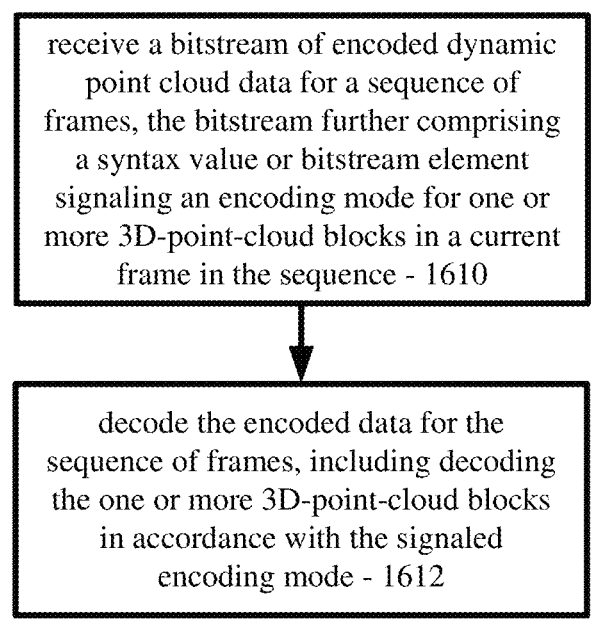
FIG. 16 is a flowchart illustrating an example process for decoding point cloud data for a sequence of frames using aspects of the disclosed technology.

FIG. 16 is a flowchart (1600) illustrating an example process for decoding point cloud data for a sequence of frames using aspects of the disclosed technology. In particular, the flowchart (1600) shows a process by which 3D-point-cloud blocks for a current frame (e.g., a frame comprising voxelized point cloud data) can be decoded from a bitstream according to embodiments of the disclosed technology. The disclosed embodiment can be performed by a computing device implementing a three-dimensional video decoder, which may be further configured to generate and display a decoded voxelized point cloud (e.g., through use of an augmented-reality or virtual-reality headset, near-eye display, stereoscopic display, flat panel display, or other such display device). The decoder can be part of a decoder system, which can comprise, for example, a buffer configured to receive and temporarily store the bitstream as it is being decoded. The decoder system can also comprise a suitable display device for displaying the reproduced voxelized point cloud data (e.g., via an augmented-reality or virtual-reality headset, flat panel display, near-eye display, stereoscopic display, or other such display device). The particular embodiment illustrated should not be construed as limiting, as the disclosed method acts can be performed alone, in different orders, or at least partially simultaneously with one another. Further, any of the disclosed methods or method acts can be performed with any other methods or method acts disclosed herein.

At (1610), a bitstream of encoded dynamic point cloud data for a sequence of frames is received. In this example, the bitstream further comprises a syntax value or bitstream element signaling an encoding mode for one or more 3D-point-cloud blocks in a current frame in the sequence (e.g., for each 3D-point-cloud block).

At (1612), the encoded data for the sequence of frames is decoded. As part of the decoding, the decoding of the one or more 3D-point-cloud blocks of the current frame is performed in accordance with the signaled encoding mode.

In particular implementations, the signaled encoding mode is one of multiple available encoding modes, which include at least an intra-frame coded mode and an inter-frame coded mode. Further, when the signaled encoding mode indicates inter-frame encoding for the one or more 3D-point-cloud block, the decoding can comprise decoding motion vector data for one or more 3D-point-cloud block of the current frame, the motion vector data indicating three-dimensional translational movement of one or more voxels from a previous frame, and decoding the respective 3D-point-cloud block using the one or more voxels from the previous frame translated according to the motion vector data as predictors of voxels in the one or more 3D-point-cloud block in the current frame being decoded.

Embodiments of the disclosed techniques have particular application to scenarios in which efficient, fast encoding is desirable, such as real-time encoding situations (e.g., encoding of live events, video conferencing applications, and the like). Thus, the disclosed techniques can be performed when an encoder is operating in a low-latency and/or fast encoding mode (e.g., for real-time (or substantially real-time) encoding, such as during the encoding of live events or video conferencing).

Further, any of the aspects of the disclosed technology disclosed herein can be used with other embodiments disclosed herein. For instance, any aspect of the embodiments disclosed with respect to FIGS. 14, 15, and 16 can be used in combination with one another.

VII. Concluding Remarks

Having described and illustrated the principles of the disclosed technology with reference to the illustrated embodiments, it will be recognized that the illustrated embodiments can be modified in arrangement and detail without departing from such principles.

For instance, the disclosed technology can be adapted for use with B-frames (bi-directional prediction) as well (e.g., where the GOP is, for example, an IBBPBBP . . . format). Furthermore, in some embodiments, adaptive 3D block sizes are used rather than a singled-sized 3D block. Further, the adaptive 3D block sizes can be selected using an RD measure. Still further, in some embodiments, both the geometry and the color residues for the predicted (P and B) blocks are encoded. Finally, rather than re-using the correspondences from the surface reconstruction among consecutive frames, other efficient motion estimation methods can be used with the coder.

Still further, elements of the illustrated embodiments shown in software may be implemented in hardware and vice-versa. Also, the technologies from any example can be combined with the technologies described in any one or more of the other examples. It will be appreciated that procedures and functions such as those described with reference to the illustrated examples can be implemented in a single hardware or software module, or separate modules can be provided. The particular arrangements above are provided for convenient illustration, and other arrangements can be used.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims and their equivalents.

We claim:

1. A video encoder system, comprising:
    an input buffer configured to store voxelized point cloud data of a sequence of three-dimensional ("3D") video frames to be encoded;
    a reference frame buffer configured to store reconstructed voxelized point cloud data; and a video encoder configured to encode the 3D video frames of the sequence by performing operations comprising:

storing, in the reference frame buffer, a reconstructed version of a previous 3D video frame of the sequence, for use as a reference 3D video frame in motion-compensated prediction;

encoding a current 3D video frame of the sequence, including:

determining one or more occupied 3D-point-cloud blocks in the current 3D video frame, wherein each of the one or more occupied 3D-point-cloud blocks in the current 3D video frame includes multiple voxels of the current 3D video frame, at least one of the multiple voxels in each of the one or more occupied 3D-point-cloud blocks being an occupied voxel;

selecting an encoding mode for the one or more occupied 3D-point-cloud blocks in the current 3D video frame, the encoding mode being one of a plurality of available encoding modes, the plurality of available encoding modes including an intra-frame encoding mode and an inter-frame encoding mode;

encoding the one or more occupied 3D-point-cloud blocks of the current 3D video frame according to the selected encoding mode, including, for a given one of the one or more occupied 3D-point-cloud blocks that is encoded in the inter-frame encoding mode:

determining motion information for the given occupied 3D-point-cloud block; and applying the motion information for the given occupied 3D-point-cloud block to identify a reference 3D-point-cloud block, in the reference 3D video frame stored in the reference frame buffer, to use as a predicted 3D-point-cloud block for the given occupied 3D-point-cloud block; and outputting, as part of a bitstream, encoded data for the current 3D video frame, the encoded data for the current 3D video frame including encoded data for the one or more occupied 3D-point-cloud blocks.

2. The video encoder system of claim 1, wherein the bitstream includes a syntax element signaling the selected encoding mode for the one or more occupied 3D-point-cloud blocks.

3. The video encoder system of claim 1, wherein the motion-compensated prediction is block translational, affine, or non-rigid.

4. The video encoder system of claim 1, wherein the motion-compensated prediction uses block replenishment.

5. The video encoder system of claim 4, wherein the block replenishment comprises:

matching the given occupied 3D-point-cloud block from the current 3D video frame with a corresponding occupied 3D-point-cloud block from the reference 3D video frame using the motion information, wherein the motion information is motion vector data; and encoding the motion vector data for the given occupied 3D-point-cloud block.

6. The video encoder system of claim 4, wherein the block replenishment excludes encoding of geometry residuals.

7. One or more computer-readable memory or storage devices storing computer-executable instructions which, when executed by a computing device, cause the computing device to perform encoding operations comprising:

storing, in a reference frame buffer, a reconstructed version of a previous three-dimensional ("3D") video frame of a sequence of 3D video frames, for use as a reference 3D video frame in motion-compensated prediction;

encoding a current 3D video frame in the sequence, the current 3D video frame being formed from a plurality of 3D-point-cloud blocks, the encoding the current 3D video frame including:

determining occupied ones of 3D-point-cloud blocks in the current 3D video frame, wherein each of the occupied ones of the 3D-point-cloud blocks in the current 3D video frame includes multiple voxels of the current 3D video frame, at least one of the multiple voxels in each of the occupied ones of the 3D-point-cloud blocks being an occupied voxel;

encoding each of the occupied ones of the 3D-point-cloud blocks using either intra-frame or inter-frame encoding, the encoding the each of the occupied ones of the 3D point-cloud blocks including, for a given occupied 3D-point-cloud block of the occupied ones of the 3D point-cloud blocks that is encoded using the inter-frame encoding:

determining motion information for the given occupied 3D-point-cloud block; and applying the motion information for the given occupied 3D-point-cloud block to identify a reference 3D-point-cloud block, in the reference 3D video frame stored in the reference frame buffer, to use as a predicted 3D-point-cloud block for the given occupied 3D-point-cloud block; and outputting, as part of a bitstream, encoded data for the current 3D video frame.

8. The one or more computer-readable memory or storage devices of claim 7, wherein the encoding the current 3D video frame further comprises applying one or more voxel-distortion-correction filters to at least part of the current 3D video frame, the one or more voxel-distortion-correction filters being applied in-loop during inter-frame encoding.

9. The one or more computer-readable memory or storage devices of claim 8, wherein the one or more voxel-distortion-correction filters comprise a filter implementing a morphological process.

10. The one or more computer-readable memory or storage devices of claim 9, wherein the morphological process comprises:

a dilation phase; and an erosion phase.

11. The one or more computer-readable memory or storage devices of claim 10, wherein the dilation phase comprises replicating one or more existing occupied voxels volumetrically to volumetric neighbors.

12. The one or more computer-readable memory or storage devices of claim 8, wherein the one or more voxel-distortion-correction filters include a filter implementing an adaptive smoothing process.

13. A method comprising:

by a computing device implementing a decoder for three-dimensional ("3D") video data:

receiving, as part of a bitstream, encoded data for one or more occupied 3D-point-cloud blocks in a current 3D video frame of a sequence of 3D video frames, wherein each of the one or more occupied 3D-point-cloud blocks in the current 3D video frame includes multiple voxels of the current 3D video frame, at least one of the multiple voxels in each of the one or more occupied 3D-point-cloud blocks being an occupied voxel, the bitstream comprising one or more syntax elements signaling a mode for the one or more occupied 3D-point-cloud blocks in the current 3D video frame; and decoding the encoded data to reconstruct the one or more occupied 3D-point-cloud blocks in accordance with the signaled mode, wherein the signaled mode is one of multiple available modes, the multiple available modes including at least an intra-frame mode and an inter-frame mode, and wherein the decoding the encoded data to reconstruct the one or more occupied 3D-point-cloud-blocks includes, for a given one of the one or more occupied 3D-point-cloud blocks that is decoded using motion-compensated prediction according to the inter-frame mode:

determining motion information for the given occupied 3D-point-cloud block; and applying the motion information for the given occupied 3D-point-cloud block to identify a reference 3D-point-cloud block, in a reference 3D video frame stored in a reference frame buffer, to use as a predicted 3D-point-cloud block for the given occupied 3D-point-cloud block.

14. The method of claim 13, wherein the motion information is motion vector data indicating 3D translational movement of voxels from the reference 3D video frame.

15. The method of claim 13, wherein the motion-compensated prediction is block translational, affine, or non-rigid.

16. The method of claim 13, wherein the motion-compensated prediction uses block replenishment.

17. The method of claim 16, wherein the block replenishment excludes encoding of geometry residuals.

18. The video encoder system of claim 1, wherein the selecting the encoding mode is based at least in part on a correspondence-based distortion metric, a projection-based distortion metric, or a combination of both the correspondence-based distortion metric and the projection-based distortion metric.

19. The video encoder system of claim 1, wherein the selecting the encoding mode is performed in real time, and wherein the encoding the one or more occupied 3D-point-cloud blocks in the current 3D video frame further comprises:

entropy coding the motion information for the given occupied 3D-point-cloud block.

20. The one or more computer-readable memory or storage devices of claim 7, wherein the motion-compensated prediction is block translational, affine, or non-rigid.

* * * * *